(12) United States Patent
Baker

(10) Patent No.: US 12,354,014 B2
(45) Date of Patent: Jul. 8, 2025

(54) GENERATION AND DISCRIMINATION TRAINING AS A VARIABLE RESOLUTION GAME

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 18/852,145

(22) PCT Filed: Mar. 14, 2023

(86) PCT No.: PCT/US2023/064296
§ 371 (c)(1),
(2) Date: Sep. 27, 2024

(87) PCT Pub. No.: WO2023/192766
PCT Pub. Date: Oct. 5, 2023

(65) Prior Publication Data
US 2025/0103896 A1 Mar. 27, 2025

Related U.S. Application Data

(60) Provisional application No. 63/362,267, filed on Mar. 31, 2022.

(51) Int. Cl.
*G06N 3/045* (2023.01)
*G06N 3/094* (2023.01)

(52) U.S. Cl.
CPC ............. *G06N 3/094* (2023.01); *G06N 3/045* (2023.01)

(58) Field of Classification Search
CPC .............................. G06N 3/094; G06N 3/045
See application file for complete search history.

(56) References Cited

U.S. PATENT DOCUMENTS

| | | |
|---|---|---|
| 2020/0143240 A1 | 5/2020 | Baker |
| 2020/0210842 A1 | 7/2020 | Baker |
| 2020/0265320 A1 | 8/2020 | Baker |
| 2020/0279165 A1 | 9/2020 | Baker |
| 2020/0285939 A1 | 9/2020 | Baker |

(Continued)

FOREIGN PATENT DOCUMENTS

| | | |
|---|---|---|
| WO | 2020088330 A1 | 5/2020 |
| WO | 2021174935 A1 | 9/2021 |
| WO | 2023192766 A1 | 10/2023 |

OTHER PUBLICATIONS

Adiban, et al., Step-GAN: A Step-By-Step Training for Multi Generator GANS with Application to Cyber Security in Power Systems, [received Jan. 17, 2024]. Retrieved from Internet:<https://arxiv.org/abs/2009.05184> (Year: 2020).*

(Continued)

*Primary Examiner* — Miranda M Huang
*Assistant Examiner* — Bart I Rylander
(74) *Attorney, Agent, or Firm* — K&L Gates LLP

(57) ABSTRACT

Computer-implemented systems and method train a generator and a discriminator, through machine learning, where the generator and discriminator are trained in an adversarial relationship using a simulated, multi-player game. The model parameters for the generator and the discriminator can be updated non-simultaneously. Also, the simulated, multi-player game may comprise a two-person, zero-sum game.

36 Claims, 10 Drawing Sheets

(56) References Cited

U.S. PATENT DOCUMENTS

| | | | |
|---|---|---|---|
| 2020/0320371 A1 | 10/2020 | Baker |
| 2020/0401869 A1 | 12/2020 | Baker |
| 2020/0410090 A1 | 12/2020 | Baker |
| 2020/0410295 A1 | 12/2020 | Baker |
| 2021/0074274 A1 | 3/2021 | Duong et al. |
| 2021/0178263 A1 | 6/2021 | St-Pierre et al. |
| 2022/0335296 A1 | 10/2022 | Baker |
| 2022/0335305 A1 | 10/2022 | Baker |
| 2022/0383131 A1 | 12/2022 | Baker |
| 2023/0289434 A1 | 9/2023 | Baker |

OTHER PUBLICATIONS

Creswell, et al, Generative Adversarial Networks, [received Jan. 17, 2024]. Retrieved from Internet: <https://ieeexplore.ieee.org/abstract/document/8253599?casa_token=6rDw6h0bZ9kAAAAA:QLZx0vOA4NFGMd_c1a9PC1mrBlp0YytQ1_9V1rU32a3bbW2T6yLlodmTx77FR5v_mm3F7otd> (Year: 2018).*

Farnia, et al, Train simultaneously, generalize better: Stability of Gradient-based minimax learners, [received Jan. 17, 2024]. Retrieved from Internet:<https://proceedings.mlr.press/v139/farnia21a.html> (Year: 2021).*

Jin, et al, A multi-player Minimax Game for Generative Adversarial Networks, [received Jan. 17, 2024]. Retrieved from Internet:<https://ieeexplore.ieee.org/abstract/document/9102779?casa_token=7dEH9ga9N7QAAAAA:NgO0LGtnfEm1uHMcO6HoQV55yV5SnrTVqJnV427wTNaSwHeVgCQ1eYjhM_q38u9Elu3sTZj> (Year: 2020).*

Wu, et al, PD-GAN: Adversarial Learning for Personalized Diversity-Promoting Recommendation, [received Jan. 17, 2024]. Retrieved from internet:<chrome-extension://efaidnbmnnnibpcajpcglclefindmkaj/https://www.ijcai.org/proceedings/2019/0537.pdf> (Year: 2019).*

International Search Report and Written Opinion for corresponding International Application No. PCT/US2023/064296, mailed Jun. 22, 2023.

* cited by examiner

GENERATION AND DISCRIMINATION TRAINING AS A VARIABLE RESOLUTION GAME

PRIORITY CLAIM

The present application is a U.S. National Stage Entry under 35 U.S.C. § 371 of International Patent Application No. PCT/US2023/064296, filed Mar. 14, 2023, which claims priority under 35 U.S.C. § 119 (e) to U.S. provisional patent application Ser. No. 63/362,267, filed Mar. 31, 2022, which is incorporated herein by reference in its entirety.

BACKGROUND

In recent years, Generative Adversarial Networks (GANs) have produced remarkable results, such as generating realistic images of fake faces, that is, images that look like human faces but that are not faces of any real people. The training process for GANs simultaneously trains, in an adversarial relationship, a generator and a discriminator. The discriminator is trained to distinguish real images from artificially generated images, and the generator is trained to fool the discriminator.

However, there are difficulties in training GANs and related generators. Some of these difficulties have been present since the earliest GAN system and have been the focus of much intense research. The research has reduced the severity or frequency of occurrence of these difficulties but has not eliminated them. Examples of difficulties include: (1) the need to carefully balance throughout the training process the quality of the partially trained discriminator and the partially trained generator; (2) instability in the training process; (3) mode collapse or partial mode collapse, which is the tendency of the generator to produce realistic images for some subset of the data categories and to ignore others; (4) the trained discriminators are not useful for other applications and are typically thrown away; and, (5) generators receive little or no training on real data but are trained only or mostly on generated data and, therefore, are slow to learn about real data regions for which there has been no generated data.

SUMMARY

In one general aspect, the present invention is directed to computer-implemented, machine-learning systems and methods for training a generator and a discriminator together, but in an adversarial relationship. The generator and discriminator are trained according to a multi-player, simulated game where each player, for example, the generator player and the discriminator player, can employ pure and mixed strategies. The game may be a zero-sum game without causing instability in the training process. In fact, a zero-sum game formulation is preferred because it is a more natural representation of the competitive relationship between discriminators and the generators, and because the stability and convergence of the training process is even better for a zero-sum formulation than for a non-zero-sum formulation. A finite, zero-sum game has a von Neumann solution rather than merely a Nash equilibrium. Unlike a Nash equilibrium, the value of a von Neumann solution is unique. Neither player can improve their result by deviating from a von Neumann solution if the other player is using a von Neumann solution. This property further assures stability in the training process.

In other embodiments the game may include additional players and coalitions between the players.

Benefits for training a generator and/or discriminator according to embodiments of the present invention will be apparent from the description that follows.

FIGURES

Various embodiments of the present invention are described in connection with the following figures.

Figure 5:
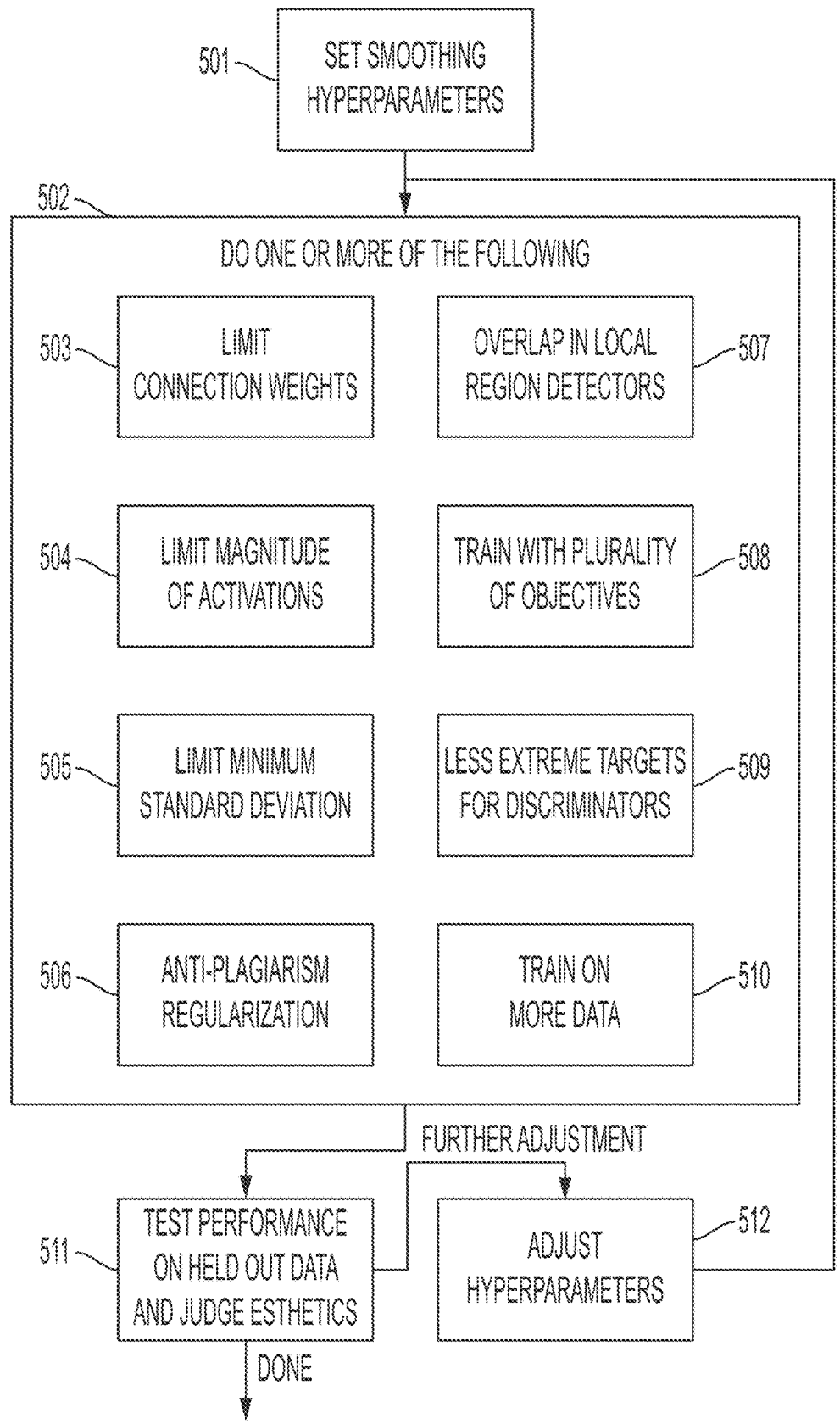

FIG. 5 a flow chart of an illustrative embodiment of an aspect of the invention.

Figure 6:
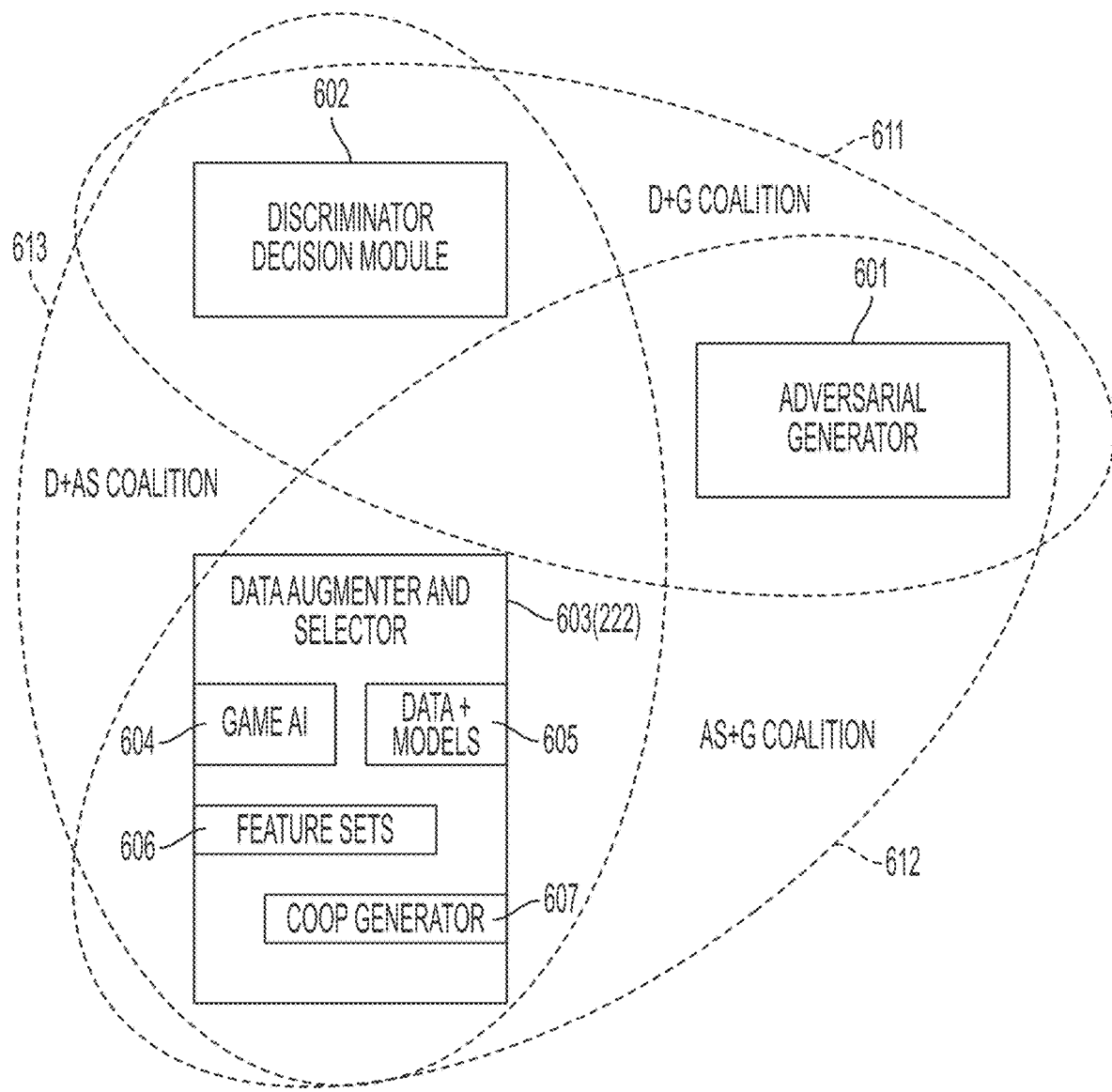

FIG. 6 depicts a three-person cooperative game according to various embodiments of the present invention.

Figure 7:
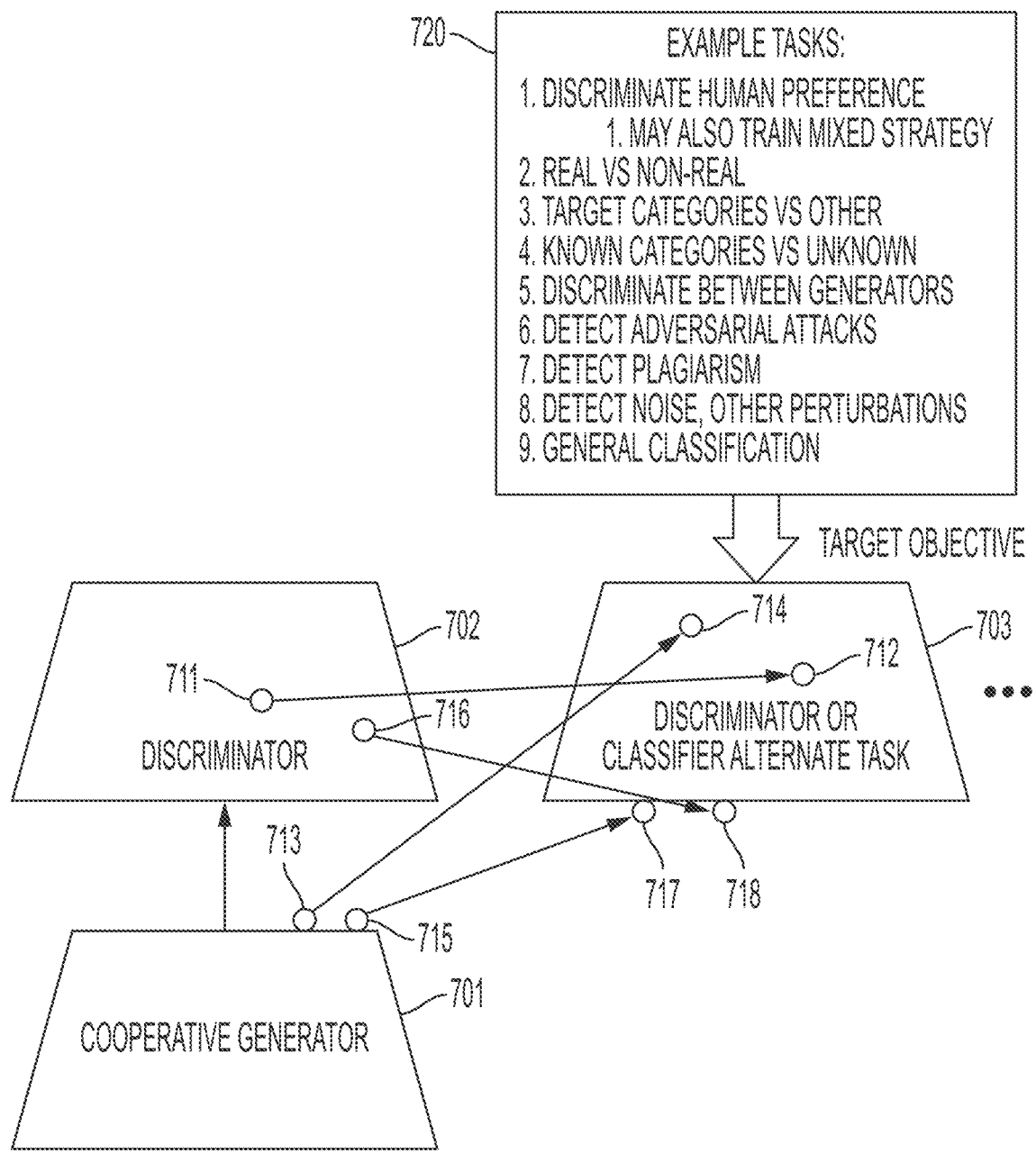

FIG. 7 is a system diagram of an illustrative embodiment of an aspect of the invention.

Figure 8:
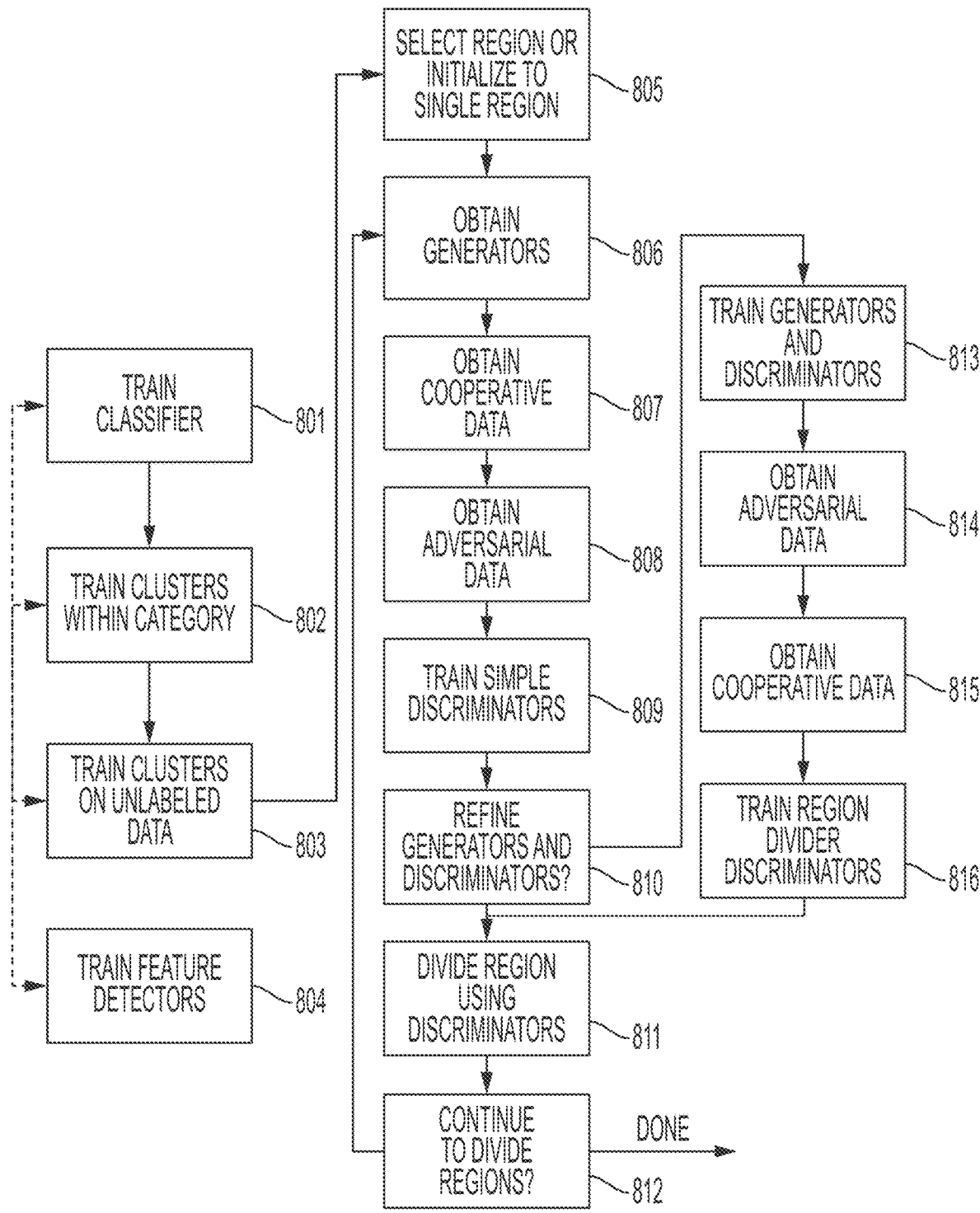

FIG. 8 is flowchart, according to various embodiments of the present invention, of a development process that facilitates step by step of training of generators and discriminators for a succession of domains of gradually increasing complexity.

Figure 9:
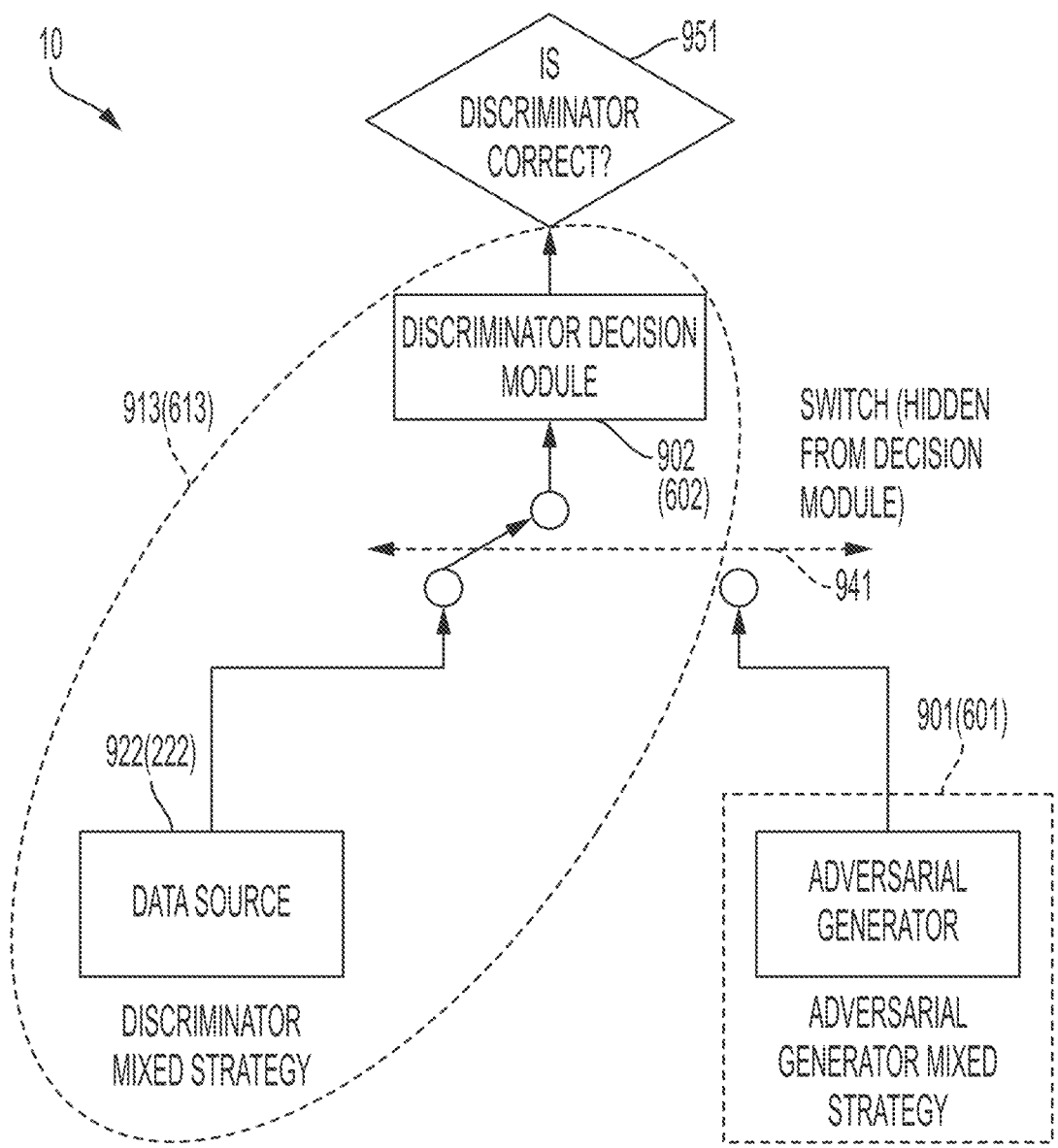
Figure 10:
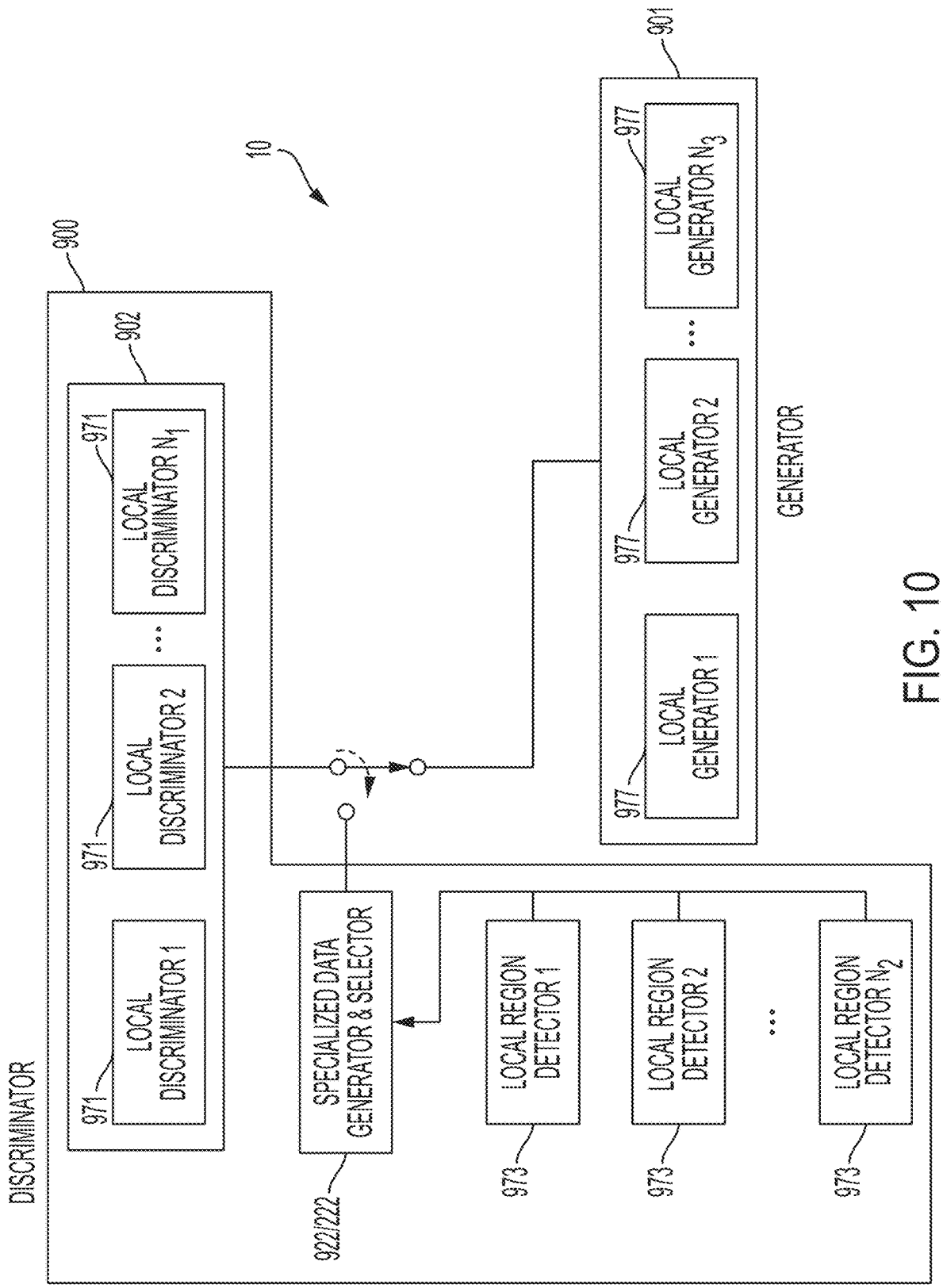

FIGS. 9 and 10 are diagrams of a machine learning system for training a generator and a discriminator together, but in an adversarial relationship, according to a multi-player, simulated game, according to various embodiments of the present invention.

DESCRIPTION

FIGS. 9 and 10 are diagrams of a machine learning system 10 that comprises a discriminator 900 and a generator 901 in an adversarial relationship according to various embodiments of the present invention. The generator 901 can comprise an adversarial generator (also shown as element 601 in FIG. 6) and the discriminator 900 can comprise a discriminator decision module 902 (also referred to herein sometimes as "discriminator" and also shown as element 602 in FIG. 6). The discriminator decision module 902 is trained to determine, or discriminate, whether an input data item to the discriminator decision module 902 was generated from the generator 901 or whether it is from another source 922 of data samples, which other data source 922 can be embodied, for example, as the specialized data generator and selector 222 in FIGS. 2 and 10, which can be a component of, or at least in a cooperative relationship with, the discriminator. In particular, the discriminator decision module 902 can be trained through machine learning to estimate the probabilities that the input sample to the discriminator decision module 902 came from the adversarial generator 901 and from the data source 922. The generator 901 is trained through machine learning to maximize the probability of the discriminator decision module 902 making a mistake (determined at block 951 of FIG. 9) as to the source of the input item to the discriminator decision module 902. In particular, the discriminator decision module 902 and generator 901 are trained, according to various embodiments of the present invention, using a multi-player game where the players can employ pure and mixed strategies, as described below. In various embodiments, the game can include two players, as shown in FIG. 9: a generator player that controls the generator 901 and a discriminator player that controls aspects of both the discriminator decision module 902 and the data source 922. The players are implemented by a computer system, such as the computer system shown in FIG. 3. In other embodiments, there may be additional players (also implemented by the computer system 300 in the simulated game), such as shown in FIG. 6, which is described further below.

Figure 1:
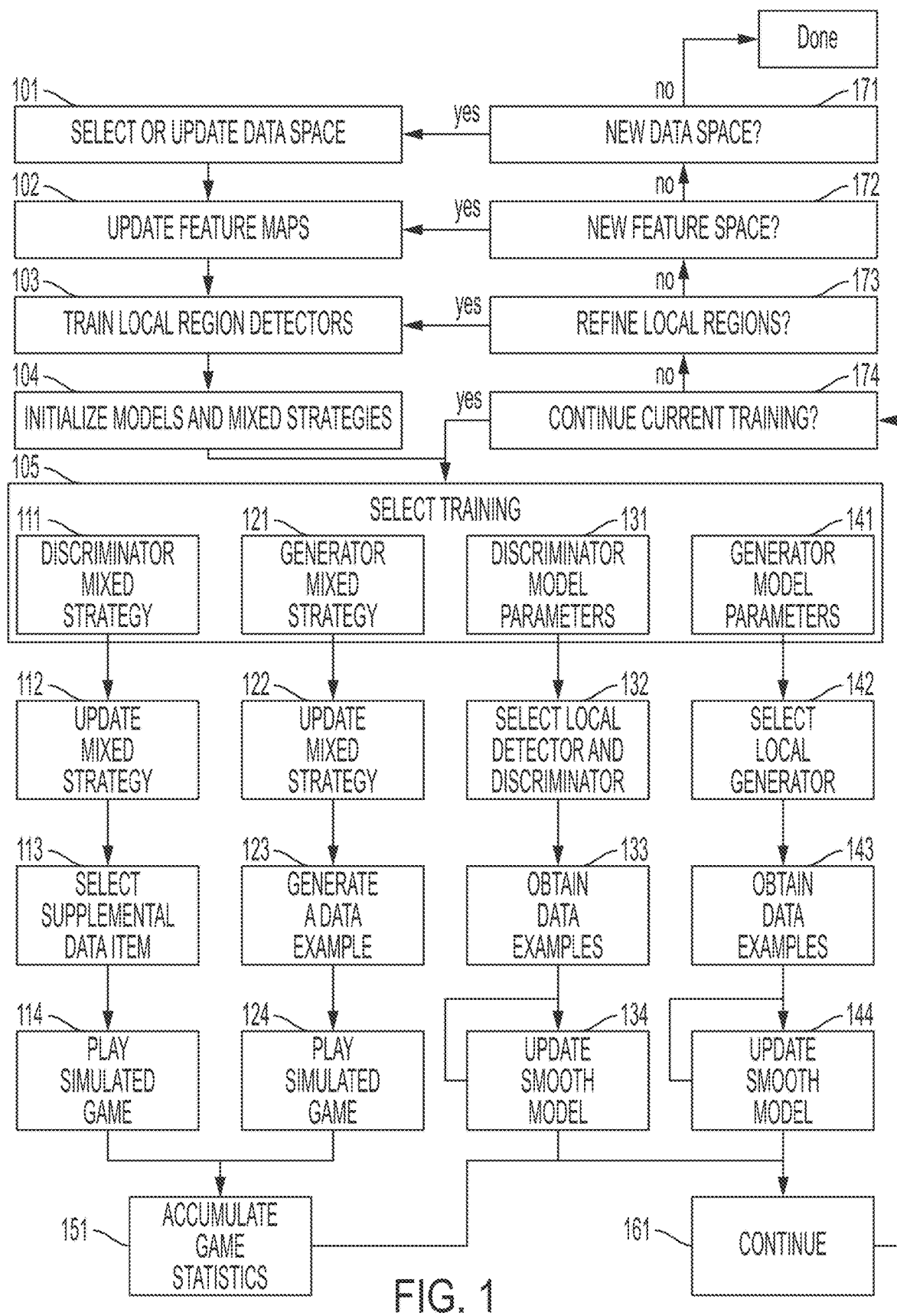
FIG. 1 is a flowchart of an illustrative embodiment of an aspect of the invention for training a set of discriminators and a set of adversarial data generators.

FIG. 1 is a flowchart of an illustrative embodiment of an aspect of the invention for training a set of "local" discriminators 971 for the discriminator decision module 902 and a set of adversarial data generators ("local generators" 977) for the generator 901. Each local discriminator 971 also has an associated local region, and is trained to discriminate whether a presented data item (i.e., a data item presented to the local discriminator 971) is from a corresponding local generator 977 or not. Thus, there can be a local discriminator 971 for each local generator 977, although in other embodiments the quantities of local discriminators 971 and local generators 977 could be unequal. Also as explained below, the discriminator 900 may include, or at least cooperate with, a plurality of local region detectors 973, which are each trained to discriminate whether a presented data item to the local region detector is accepted or rejected as being a member of a specified set associated with a corresponding local region detector 977. Thus, the quantity of local region detectors 973 could be equal to the quantity of local region generators 977, although in other embodiments the quantities could be unequal. The steps in the flow chart of FIG. 1 may be implemented in software on a computer system such as computer system 300 illustrated in FIG. 3.

A key aspect of the illustrative embodiment shown in FIG. 1 is that computer system 300 separates the modeling and training of strategies (blocks 111-114 and 121-124) for the sets of discriminators and data generators from the tactical modeling and training (blocks 131-134 and 141-144) of the sets of discriminators and data generators. As a preview, in blocks 111-114, the system 10 trains a mixed strategy of the discriminator 900, which involves playing a simulated game 114. In blocks 121-124, the system 10 trains a mixed strategy of the generator 901, which involves playing a simulated game 124. In blocks 131-134, learned parameters for machine learning components of the discriminator 900 are updated. In blocks 141-144, learned parameters for machine learning components of the generator 901 are updated. The updates to the strategies and to the learned parameters can be based on accumulated statistics 151 from the games. Preferably, the processes 111-114, 121-124, 131-134 and 141-144 are not performed simultaneously. Instead they can be performed one at a time and in no particular order, although preferably the games are played (i.e., steps 111-114 and 121-124) more frequently than the learned parameters are updated (i.e., steps 131-134 and 141-144).

The strategies can comprise pure strategies and mixed strategies in the sense of the classical theory of games of John von Neumann and Oscar Morgenstern. In this context, a pure strategy is a game strategy where the player adopts a strategy or tactic that provides the best payoff. In a mixed strategy, a player chooses a strategy, or tactic, according to a probability distribution. The tactics can comprise local models, which helps simplify and stabilize the training of the sets of discriminators and data generators.

In the training, in the illustrative embodiment, computer system 300 can also separate the iterative updates of the discriminator models 971 (blocks 131-134, see also blocks 971 of FIG. 10) from the iterative updates of the generator models (blocks 141-144; see also blocks 977 of FIG. 10), e.g., the models for local generators of the generator 901, i.e., the iterative updates for the discriminator models are not simultaneous with the iterative updates for the generator models 977, which eliminates potential cyclic updates and adds convergence.

This illustrative embodiment demonstrates several general principles that computer system 300 may implement and combine in various ways in different aspects and different embodiments of the invention. Furthermore, computer system 300 may use different embodiments and different design choices for different applications. For example, in some applications, once the training of the generator 901 and discriminator 902 is complete, only the local generators 977 of the generator 901 are important for operational use, and the discriminator models 971 of the discriminator 902 are discarded or not used, as typically happens in adversarial generator training systems. In some embodiments of the invention, however, the discriminator models 971 are equally or more important than the generator models 977 and, as such, the discriminator models 971 are retained for operational use once trained.

There are options in the arrangement of the components of the system and in the order of execution of the operations during training. These options may be actively controlled by computer system 300 and/or by human developers working cooperatively as a human team plus AI training process control system 221 (see FIG. 2). The training process control system 221 enables custom control and adjustment of the training process to fine tune the training actively during the training process rather than following prespecified rules. The optional participation of the human team enables human guidance during the training process.

There are several broad principles shown in the illustrative embodiment that may be applied in other embodiments. First, the training process comprises a classical game of strategy in which both discriminator player 900 (also indicated by blocks 111-114 in FIG. 1) and the generator player 901 (also indicated by blocks 121-124 in FIG. 1) actively select a strategy. This property contrasts with systems for training adversarial generators in which the discriminator system is a passive pattern recognition system that has no ability to select strategies.

Second, the game may be a zero-sum game without causing instability in the training process. In fact, a zero-sum game formulation is preferred, not only because it is a more natural representation of the competitive relationship between discriminators and the generators, but the stability and convergence of the training process is even better for a zero-sum formulation than for a non-zero-sum formulation.

Third, enabling active selection of strategies by the discriminator player actively detects mode collapse or partial mode collapse in the training of the generator system, which then causes the generator system to learn to correct the mode collapse.

Fourth, the game play portion of the training process may be a finite zero-sum game, enabling simple methods for training the mixed strategies of the two players.

Fifth, the fine tuning of the parameters in the pattern recognition systems used by the players (blocks 131-134 and 141-144 in FIG. 1) is a separate training process from the training of the mixed strategies.

Sixth, the fine tuning of the parameters in the pattern recognition systems may be done independently in each of a plurality of local virtual "regions," simplifying the training process.

Seventh, the finite, zero-sum game has a von Neumann solution rather than merely a Nash equilibrium. Unlike a Nash equilibrium, the value of a von Neumann solution is unique. Neither player can improve their result by deviating from a von Neumann solution if the other player is using a von Neumann solution. This property further assures stability in the training process.

Eighth, on the other hand, if one player is using a non-optimum solution (for example, partial mode collapse by the generator), then the second player may take advantage of the non-optimum solution to achieve a result that is better than the von Neumann solution. This mechanism is one of the ways that mode collapse and other deficiencies in a partially trained generator system are detected and corrected.

Ninth, to support the active selection of a strategy for the discriminator player, computer system 300 may implement a specialized data generator and selector system 222 (see FIGS. 2 and 10) as the data source 922 of other data items for the discriminator 902. This subsystem enables computer system 300 to supply an unlimited quantity of training data examples for training the local discriminator systems 971 of the discriminator 902.

Tenth, the update of the mixed strategy of the discriminator player (block 112) is separated from the update of the mixed strategy of the generator player (block 122). In the illustrated embodiment of FIG. 1, the mixed strategies are trained by simulated repeated play of the game. Preferably, the update of the mixed strategy of the discriminator player alternates with the update of the generator player, which is a more stable iterative process than simultaneous updates.

Eleventh, the update of the parameters of the discriminator pattern recognition models is separate from and, preferably, alternates with the update of the parameters of the generator pattern recognition models, which is more stable than simultaneous updates such as with simultaneous gradient descent.

The illustrative embodiment shown in FIG. 1 comprises a loop from block 171 back to block 101. In block 101, computer system 300 selects or updates a data space. In the loop back to block 101, computer system 300 may refine a previously selected or updated data space or select a new data space. For example, in image generation, computer system 300 may initially select a data space of low-resolution images with a small number of pixels and may increase the resolution and number of pixels in each successive loop through block 101.

Figure 2:
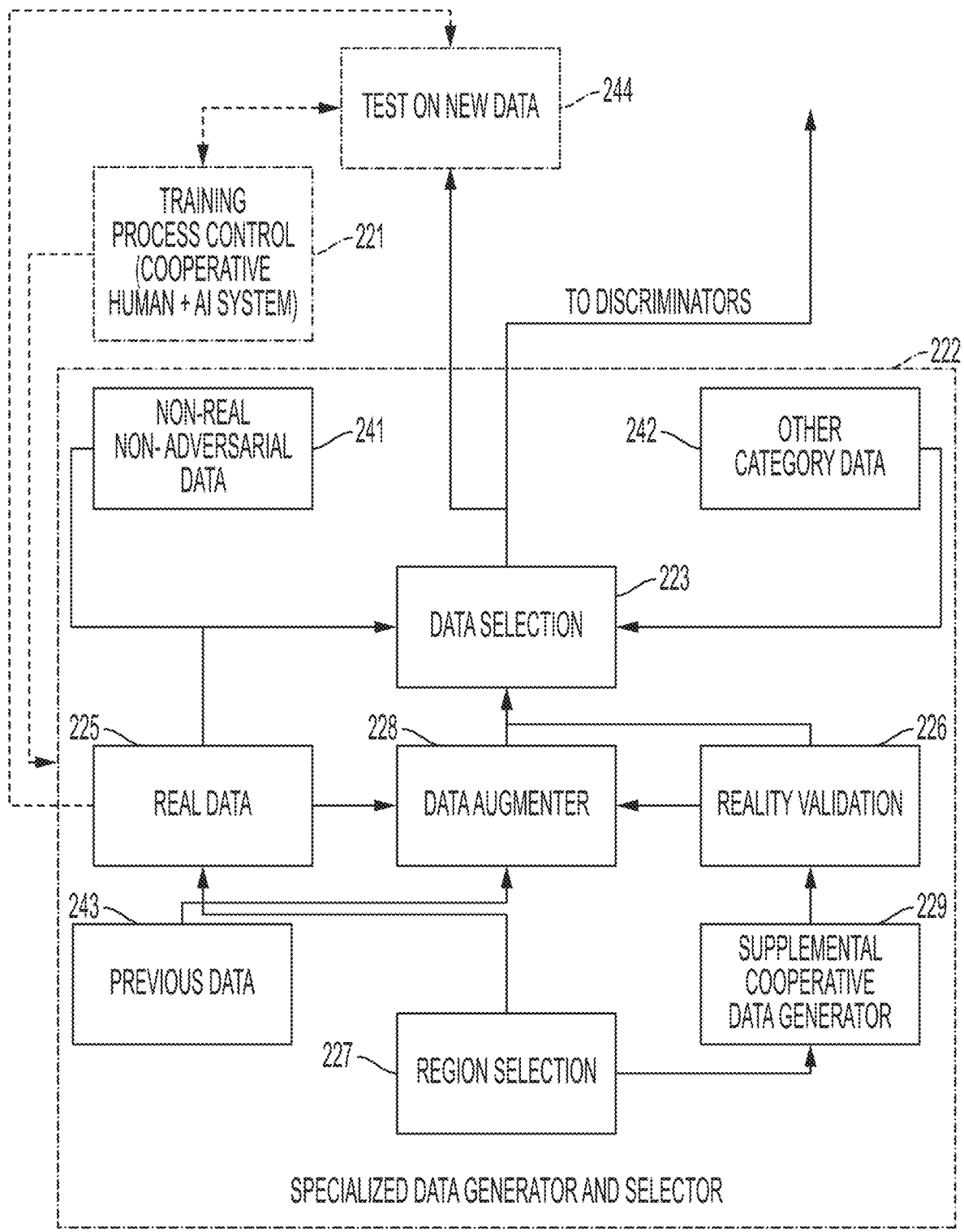
FIG. 2 is an illustrative embodiment of an aspect of the invention.

The refinement of the data space and the stopping criteria for the loop in block 171 may be controlled by predetermined criteria set by the system designer or by a cooperative training process control system (see block 221 in FIG. 2). The cooperative training process control system 221 may comprise a human team and one or more AI systems working cooperatively. In this context, the word "cooperative" refers to the cooperation between the human team and the AI systems. In block 229 of FIG. 2, the word "cooperative" refers to the cooperation between a generator and discriminator of the discriminator 900, in contrast to the adversarial generators 901. The AI systems of the training process control system 221 may be implemented on computer system 300 or a separate computer system similar to computer system 300.

In block 102, computer system 300 obtains or updates a set of one or more feature spaces and mappings from the data space selected in block 101 to each feature space. In some embodiments, the data space selected by computer system 300 in block 101 may be used as a feature space and the mapping may be the identity function. Preferably, under control of the training process control system (see block 221 of FIG. 2) computer system 300 selects a feature space that facilitates the training of local region detectors 973 (see FIG. 10) of the discriminator 900 by computer system 300 in block 103.

Computer system 300 may train a feature space using any of several methods that are well known to those skilled in the art of training neural networks and/or may use methods specifically related to various embodiments of this invention.

For example, computer system 300 may train an autoencoder with a bottleneck layer and use the bottleneck layer activations as the features in a feature space, which is well known to those skilled in the art of training neural network autoencoders. Computer system 300 may then use the encoder of the autoencoder as a feature mapping system. Specialized to some embodiments of this invention, the training of the autoencoder may further comprise back propagation to the bottleneck layer from objectives in addition to the objective of reproducing the input, which is the defining characteristic of an autoencoder. For example, computer system 300 may back propagate to the bottleneck layer from the training of a classifier 801, from supervised training of clusters 802, and/or from unsupervised training of clusters 803, as illustrated in FIG. 8.

As another example, computer system 300 may select as a feature space the activations of the nodes in a fully connected layer in a convolutional neural network classifier in which the convolutional layers are followed by one or more fully connected layers. In this example, computer system 300 may use additional back propagation from the training of steps 801, 802, and/or 803 for training a modified version of the convolutional classifier.

As another example, in some embodiments, the set of variables in a feature space may comprise one or more human understandable features specified by the system designer and/or the human team in cooperative human plus AI training process control system 221. In these embodiments, computer system 300 may pretrain one or more human understandable features with supervised training and may also use the methods of training discussed above for training the full set of features comprising the human understandable features.

In block 103, and with reference to FIG. 10, computer system 300 trains a plurality of local region detectors 973 for the discriminator 900. The local region detectors 973 are separate from the local discriminator models 971 of the discriminator decision module 902, and each local region detector 973 can be associated with one or more corresponding discriminator models 971 of the discriminator decision module 902. The quantity of local region detectors 973 could be the same as, or different from, the quantity of local discriminators 971 (e.g., $N_1$ can equal $N_2$ in FIG. 10 or $N_1$ can be different from $N_2$). A local region detector 973 is a machine learning system trained to discriminate whether a presented data item is accepted or rejected as being a member of a specified set. The concept of being accepted by a local detector 973 is a generalization of the concept of a local region in a vector space. The detectors 973 trained by computer system 300 in block 103 are called "local region detectors," and the set of data items accepted by a local region detector 973 is called a "local region." A "local region" in this sense does not necessarily resemble a "region" in the sense of a small, connected region in a vector space.

The local region detectors 973 may be any type of machine learning system, including, decision trees, random forests, mixtures of parametric probability distributions such as Gaussian distributions, support vector machines, or neural networks. The local region detectors 973 may be trained by supervised learning, unsupervised learning, such as unsupervised clustering, by partially supervised training with separate detectors for separate categories, or by semi-supervised learning in which some or all training data is labeled by the classification system itself.

Preferably, the selection of feature spaces by computer system 300 is made to facilitate the training of the local region detectors 973, among other objectives. For example, in the case of image recognition with convolutional neural networks, the space of vectors of activation of the nodes in one of the fully connected layers that follow the convolutional layers may be used as a feature space that facilitates clustering. As another example, the bottleneck layer of an autoencoder neural network may be used as a feature space. Such an autoencoder neural network may be trained with unsupervised learning.

In some embodiments, computer system 300 may refine the local region detectors 973 by building a hierarchy in which the set of data accepted by a former local region detector may be subdivided into the acceptance regions of two or more local region detectors that are applied to data examples accepted by the former regional detector. For example, the embodiment of an aspect of the invention illustrated in FIG. 8 extensively uses this process of subdividing local regions. FIG. 8 is described further below.

Computer system 300 uses the local region detectors 973 to define the pure strategies of the discriminator player.

In block 104, computer system 300 initializes the discriminator and generator pattern recognition models, i.e., the discriminator models 971 of the discriminator 902 and the models of the local generators 977 of the generator 901. The quantity of local generators 977 might equal the quantity of local region detectors 973 and/or local discriminators 971, or the quantity of local generators 977 might be different from the quantity of local region detectors 973 and local discriminators 971. In block 104, computer system 300 also initializes or updates the mixed strategies of the discriminator player and the generator player. For example, computer system 300 may initialize all pure strategies to be equally likely. In some embodiments, computer system 300 may initialize the mixed strategy of a player from a previous mixed strategy of that player.

In block 105, computer system 300 selects whether to train the mixed strategy of the discriminator player (sub-block 111), train the mixed strategy of the generator player (sub-block 121), train the parameters of the pattern recognition models of the discriminator player (sub-block 131), and/or train the parameters of the pattern recognition models of the generator player (sub-block 141). In using the selection process of block 105, in some embodiments, preferably computer system 300 alternates among the training processes rather than updating two competing systems at the same time.

In block 111, computer system 300 selects to update the mixed strategy of the discriminator player. In an illustrative embodiment, a pure strategy comprises computer system 300 selecting one of the local region detectors 973. Selection of a local region detector can influence generation of a data item generated by the data source 922, which might be input to the discriminator decision module 902 depending on the switch 941. A mixed strategy comprises computer system 300 selecting a pure strategy at random according to a specified probability distribution across the set of pure strategies.

Collectively in blocks 112-114, computer system 300 finds a new mixed strategy for the discriminator player that does better against the current actual or estimated mixed strategy of the generator player, except in the case in which the current strategy of the generator player is an optimum von Neumann mixed strategy.

In one example embodiment, in block 112, computer system 300 improves the current mixed strategy of the discriminator player by finding one pure strategy that does better against the current mixed strategy of the generator player than does the current mixed strategy of the discriminator player. For example, computer system 300 may compute the payoff of each pure strategy against the current mixed strategy of the generator player and select the one that scores best. Unless the generator player is using a von Neumann mixed strategy that is optimum against the current set of local region detectors 973, computer system 300 may improve the performance of the current mixed strategy of discriminator player by incrementing the probability of the selected pure strategy. This improvement may be achieved even if the discriminator player is already using an optimum von Neumann mixed strategy.

That is, if the current mixed strategy of the generator player is not optimum, the discriminator player can take advantage of that circumstance. In repeated play, this strategy by the discriminator player will only work until the generator player fixes the generator's mixed strategy. The discriminator player then needs to find another deficiency, until both players are using optimum von Neumann strategies, which is the desired long-term result. Temporary deviation from an optimum strategy helps accelerate the learning by the player that has not yet found an optimum strategy.

The process of computer system 300 having a player that is already close to an optimum strategy temporarily use a non-optimum strategy eliminates the need for the training process to carefully balance the abilities of the discriminator system and the generator system in each stage of the training process.

In block 113, computer system 300 selects a data item from the data source 922 based on the pure strategy selected by computer system 300 in block 112. That is, for example, computer system 300 selects a data item that is accepted by the local region detector 973 specified by the pure strategy selected by computer system 300 in block 112. In the illustrative embodiment, computer system 300 obtains such a data item from the specialized data generator and selector 222 in FIG. 2.

Computer system 300 may select the data item from among a set of training data or from data that computer system 300 has created by data augmentation. Optionally, in some embodiments, computer system 300 may select a data item that computer system 300 has generated with a supplemental cooperative generator 229 (see FIG. 2). Computer system 300 may use trimmed probability distributions in the cooperative generator 229 and may also do additional validation of the data (see block 226 of FIG. 2). A supplemental cooperative generator 229 differs from an adversarial generator 901 in being designed to be cooperative with the discriminator decision module 902 rather than competitive and in being able to use real data as the basis for its generative process.

In block 114, computer system 300 then plays a simulated game in which computer system 300 selects either the data example selected for the discriminator player by computer system 300 in block 113 from data source 922 or a data example that computer system 300 obtains from the adversarial generator player.

A simulated play of the game proceeds as follows according to various embodiments. First, computer system 300, acting on behalf of the discriminator player but without the explicit knowledge of the discriminator player, selects a local region detector 973 according to the current probabilities of the discriminator player's mixed strategy. For example, if a first local region detector has a 60% probability under the current discriminator player's mixed strategy, there would be a 60% chance that the first local region detector is detected.

Second, computer system 300, acting as the discriminator player, obtains a data example from the data source 922, such as from the specialized data generator and selector system 222 (see FIG. 2), namely the data example selected by computer system 300 in block 113. As explained herein, the data item from the specialized data generator and selector system 222 can be influenced by the selected local region detector 973.

Third, computer system 300 obtains a data example from the adversarial generator system 901. Computer system 300 first randomly selects a generator model from among the set of generator models 977 of the generator 901 based on the mixed strategy of the generator player. Computer system 300 then generates a data example using the selected generator model 977 of the generator 901. This data example is generated by computer system 300 for the adversarial generator system without regard to the local region detectors 973 of the discriminator 900 or the selection of a local region detector 973 in the "first" step above.

Fourth, in an example embodiment, computer system 300 randomly chooses whether to present the data item from the data source 922 (e.g., the specialized data generator and selector system 222) in the "second" step above or to present the accepted data item obtained from the adversarial generator system 901 in the "third" step above. The discriminator player (e.g., the discriminator decision module 902) does not know and does not learn during the play of the game, which source of data has been selected by computer system 300. In some embodiments, computer system 300, acting as the discriminator player, may first select the local region detector with the highest detection score and then determine the discrimination decision using an associated local discriminator. In some embodiments, for example, if there is overlap among local detector regions, computer system 300 may determine the discrimination decision as an ensemble decision of a plurality of local discriminators.

Fifth, computer system 300 then obtains from the discriminator system 900 whether the discriminator system 900 classifies the presented data item as real or otherwise not generated by the adversarial generator 901 (e.g., from the data source) or as generated by the adversarial generator 901. This classification may comprise a computation of the likelihood that the presented data item is from the adversarial generator 901 (and/or correspondingly a computation of the likelihood that the presented data item is from the other data source, e.g., data source 922).

Sixth, computer system 300 then determines, at block 951 of FIG. 9, whether the discriminator decision module 902 has made a correct discrimination. In some embodiments, the output of the discriminator decision module 902 is preferably a continuous-valued, piecewise-differentiable function of each input variable. Likewise, for training purposes, the output of the generator 901 is continuous values, although the output values may be quantized when the generator is deployed in an application, for example in generating digital images. To determine whether the discriminator system 900 is correct on a presented data example, computer system 300 compares the output of the discriminator decision module 902 to a specified threshold to determine whether the output indicates that the discriminator system has characterized the presented data example as obtained from the specialized data generator and selector system 222 (or other data source 922) or from the adversarial generator system 901. For example, all output values greater than or equal to the threshold value may be interpreted as indicating a data example from the specialized data generator and selector system 222 and all output values less than the threshold may be interpreted as indicating a data example that is from the adversarial generator 901. Computer system 300 then determines whether the indicated determination is correct or an error because the computer system 300 (but not the discriminator decision module 902) knows from where the data item was chosen at step 4 above.

Seventh, computer system 300 then assigns the payoff for each player. In an example embodiment, computer system 300 assigns the discriminator player a score of +1 if the discriminator classification is correct and a score of −1 if the discriminator classification is incorrect. Computer system 300 also assigns the discriminator player a score of +1 if no accepted data example is received from the adversarial generator player before a stopping criterion is reached in step (3) above. In a preferred zero-sum embodiment, computer system 300 assigns to the generator player the negative of the payoff assigned the discriminator. In some non-zero-sum embodiments, computer system 300 assigns to the generator player the negative of the payoff assigned to the discriminator only if the data item presented to the discriminator system is from the adversarial generator. Otherwise, in this example non-zero-sum embodiment, computer system 300 assigns a payoff of 0 to the generator player.

Eighth, in some embodiments, computer system 300 may assign a payoff of +1 to the discriminator player and −1 to the generator player for any presented generated data item that is within a specified anti-plagiarism distance of any of a specified set of training data items, such as works of art under copyright protection or well-known older works of art. Computer system 300 may assign these payoffs regardless of whether the discriminator classification is correct or not. In some non-zero-sum embodiments, computer system 300 may modify only the payoff to the generator player.

In block 121, computer system 300 selects to train the mixed strategy of the adversarial generator player. Collectively in blocks 122-124, computer system 300 finds a new mixed strategy for the generator player that does better against the current actual or estimated mixed strategy of the discriminator player, except in the case when the current strategy of the discriminator player is an optimum von Neumann mixed strategy.

In one example embodiment, in block 122, computer system 300 selects a pure strategy for the adversarial generator player. That is, computer system 300 can select a local generator 977 of the generator 901. In some embodiments, computer system 300 trains one or more local generators 977 to generate data that are primarily in a specific local region, that is, data that are accepted by a specific local region detector 973 of the discriminator 902. However, in some embodiments, computer system 300 may train local generators 977 without regard to the acceptance regions of the local region detectors 973.

In block 123, computer system 300 generates a data example using the local generator 977 selected in block 122.

In block 124, computer system 300 plays a round of the simulated game. Computer system 300 selects either the data example generated by the adversarial generator 901 in block 123 or a data example from the data source 922, such as a data example obtained from the specialized data generator and selector system 222 (see FIG. 2). Computer system 300 then presents the selected data example to the discriminator models 971 of the discriminator 902. The discriminator models 971 of the discriminator 902 do not know whether computer system 300 has selected the adversarial data example generated in block 123 or a supplemental realistic data item from the data source 922.

In block 124, computer system 300 computes the payoff to be assigned to each player in the same way as in block 114. The payoff may be computed as described above, for example.

Note that, preferably, block 114 and block 124 are not merged into a single block because the simulated play in block 114 uses a selected pure discriminator strategy against the current mixed strategy of the adversarial generator player whereas the simulated play in block 124 uses a selected pure strategy of the adversarial generator player against the current mixed strategy of the discriminator player.

In block 151, computer system 300 accumulates statistics from the simulated games at blocks 114 and 124, such as an empirical estimate of the mixed strategy of each player as indicated by the relative fraction of times that each pure strategy is selected in the simulated play of the game. This empirical estimate may be a weighted average of prior plays with older plays discounted.

In block 131, computer system 300 selects to update the training of parameters of one of the local discriminator models 971 (e.g., pattern recognition systems) of the discriminator 902. In some embodiments, more than one local discriminator model/system 971 may be updated at once, or block 131 may be selected on a plurality of successive loops back from block 174 to block 105.

In block 132, computer system 300 selects a local discriminator 971 and optionally selects a local detector 973 of the discriminator 902. In some embodiments, each local discriminator 971 is associated with a specific local detector 973, in which case the selection of a local detector 973 is implicit in the selection of a local discriminator 971.

In block 133, computer system 300 obtains a specified number of data examples from the data source 922 (e.g., from the specialized data generator and selector 222 of FIG. 2) and a specified number of data examples from the local generators 977 of the adversarial generator 901. In some embodiments, the data examples are restricted to data examples that are accepted by the local region detector 973 of the discriminator 900 selected by computer system 300 in block 132.

These obtained data examples are for the purpose of training the local discriminator 971 selected in block 132 and do not represent selections as moves in a simulated play of the game.

The number of data examples of each type to be obtained by computer system 300 can be controlled by the system design and/or the training process control system 221. For example, the training process control system 221 may specify a quantity of data examples that is estimated to be sufficient for accurate estimation of the learned parameters in the selected local discriminator pattern recognition system 971.

In block 134, computer system 300 uses the data examples obtained in block 133 to update the training of the local discriminator pattern recognition system 971 selected in block 132. These data examples may or may not have categorical labels, but in contrast to the data presented to the discriminator system during the simulated play of the game in block 114 or block 124, in block 134 each data example is labeled as being obtained from the specialized data generator and selector 222 or as being obtained from the adversarial generator system. In some embodiments, the output activations for the alternative outputs of a discriminator system may be constrained or normalized to sum to 1.0. The target values in training the selected local discriminator pattern recognition system 971 may be 1.0 for correct response, either as being realistic or adversarial, and 0.0 for an incorrect response. In some embodiments, computer system 300 may use less extreme target values, such as 0.9 and 0.1 to train the systems to have a smoother response as a function of small changes in the data.

As indicated by the connection from block 134 back to itself, this training update may be an iterative process, such as gradient descent for a neural network model or the EM (expectation-maximization) algorithm for a probability distribution mixture model.

In block 141, computer system 300 selects to update the training of the parameters of one of the local adversarial generator systems 977 of the generator 901.

In block 142, computer system 300 selects a local adversarial generator 977 of the generator 901.

In block 143, computer system 300 uses the selected adversarial generator to generate data examples for training the parameters of the local adversarial generator 977 selected in block 142.

In block 144, computer system 300 updates the parameters in the local adversarial generator 977. Like block 134, the parameter update at block 144 may be an iterative process, such as gradient descent for a neural network model.

If the local adversarial generator 977 is a neural network, then computer system 300 may train the neural network by mini batch based gradient descent. For each data item, the estimate of the gradient is computed by back propagation, a computation that is well known to those skilled in the art of training neural networks.

For this training, computer system 300 needs to compute the derivative of the output of the discriminator system with respect to each input variable of the discriminator, which is to say each output variable of the generator network.

If the discriminator system is a neural network, then computer system 300 may compute the derivative of the output score with respect to each input variable by back propagation.

In some embodiments, computer system 300 may compute the derivative of the output score of the discriminator 902 with respect to each input variable of the discriminator for some other form of discriminator. For example, computer system 300 may perform such a computation for a discriminator model comprising a mixture of one or more parametric probability distributions.

If the local adversarial generator 977 is a model that can be trained by examples, for example, if the local adversarial generator model 977 is a mixture of parametric probability distributions, then computer system 300 may use a different algorithm for training the generator model 977. For example, in such an embodiment, computer system 300 may use the EM algorithm, which is well known to those skilled in the art of statistical estimation. In some embodiments, computer system 300 may use gradient descent to train a generator model 977 that is a mixture of parametric probability distributions.

Block 161 is a null operation that gathers the control flows from blocks 151, 134, and 144. From block 161, computer system 300 proceeds to block 174. In block 174, computer system 300 determines whether to continue the training with the current local region detectors 973, feature spaces, and data space, based on criteria specified by, for example, the training process control system 221. If computer system 300 determines to continue the current training, computer system 300 returns to block 105, otherwise computer system 300 proceeds to block 173.

In block 173, computer system 300 determines whether to refine the local region detectors 973. For example, if computer system 300 determines that replacing a current local region detector 973 with a plurality of detectors 973 might better satisfy a specified cost-performance criterion, computer system 300 may return to block 103. In some embodiments, computer system 300 may determine to proceed to block 172 based on a specified limit on the number of training passes or other stopping criterion specified by the training process control system 221.

In block 172, computer system 300 determines whether to return to block 102 to update a feature space or the mapping from the data space to a feature space or to proceed to block 171, based on criteria specified by the training process control system 221.

In block 171, computer system 300 determines whether to return to block 101 to update the data space or to terminate the training process based on stopping criteria specified by the training process control system 221.

FIG. 2 is an illustrative embodiment of an aspect of the invention in which computer system 300 implements specialized subsystems to obtain or create additional data for the discriminator system and the local discriminators in blocks 113, 114, 124, 131-134 of FIG. 1.

Block 221 of FIG. 2 represents a cooperative human plus AI training process control system. The training process and control system comprises a human team and one or more AI systems implemented on a computer system such as computer system 300. An example of such a cooperative human plus AI system is described in PCT application WO 2021/194516 A1, to D5AI, LLC, titled "Data-dependent Node-to-node Knowledge Sharing by Regularization in Deep Learning," which is incorporated herein by reference in its entirety.

The AI systems are trained to adjust hyperparameters, set criteria for stopping conditions, and do validation testing and other testing for such decisions as determining when and by how much to refine a data space, select among candidate feature spaces, control the initialization of discriminator models, and other tasks mentioned herein in discussion of various aspects of the invention. The AI systems may be pretrained on these control tasks starting with trial and error or reinforcement learning on other tasks.

In general, in the cooperative training process control system 221, the AI systems make the routine decisions, especially those that need to be made many times or based on collecting a large quantity of information. For example, in testing a image, audio, text or other output of an adversarial generator for possible plagiarism, potentially hundreds of thousands of tests or more need to be made. In this example, the tests would be done by the AI systems, except that the human team may choose to actively intervene, or the AI systems may actively request human judgment, with specified limits on the amount of requested human assistance.

The human team may guide the AI systems, such as setting guidelines for the AI control of hyperparameters. In some embodiments, the human team may actively guide adaptive training of the AI systems to improve the performance of the AI systems on the training process control task.

Block 222 in FIG. 2 represents the specialized data generator and selector system, which comprises a collection of subsystems for augmenting and supplementing the available data for training the discriminator and generator systems.

In block 225 computer system 300 obtains "real" data. In the context of block 225 of FIG. 2, the "real" data comprises data designated for training the discriminator 902 and adversarial generator system 901 and other data from the same source that has been set aside from the selected training data. In general, computer system 300 may use unsupervised training, so the training data does not need to be labeled. However, in some optional aspects the invention may use supervised training, in which some of the real data of block 225 may be labeled. In this case, some of the data set aside from the training data may comprise labeled data.

Under guidance of the human team or of computer system 300 implementing the AI systems in the process control system, computer system 300, at block 225, provides additional real data during the training process. In addition to supplying data required for the play of the game, computer system 300 may provide additional data for various purposes.

For example, at block 244, computer system 300 may set aside data for testing the performance of the discriminator system on data that has not yet been used in training the discriminator system.

In addition, during the training process, computer system 300 may gradually add some of the data that has been temporarily set aside to the training set to improve the ability of the discriminator system to generalize.

Computer system 300 may also obtain new data to add to a repository 225 of real data to use for testing at block 244, as indicated by the dashed arrow from block 225 to block 244, and/or to add to the training data.

In some embodiments, some of the data set aside from the current training may have previously been used to train a set of discriminators and adversarial generators. In such embodiments, computer system 300 may store both the real data and adversarial data in a repository 243. During the training of the current discriminator and generator systems, computer system 300 may retrieve this previous data. In such embodiments, computer system 300 may compare the performance of the current discriminators on such data to the performance of discriminators that have been trained on the set aside data as part of the testing in block 244.

During the training process, computer system 300 may retrieve some of the real data from the repository 225 and apply a process of data augmentation at block 228. In some embodiments, computer system 300 may also apply data augmentation to the previous real data and/or the previous adversarial data in repository 243. In some aspects of some embodiments, computer system 300 may limit the data to be selected to data that is accepted by a local region detector 973 specified by computer system 300 in block 227.

Any suitable technique for data augmentation at block 228 may be used. For example, computer system 300 may perform the data augmentation at block 228 by selecting a training data item and making a change in the selected data item. Also, the system designer and/or the training process control system 221 may specify a class of small changes, such as translations, rotations, color filtering, or other perturbations that are designed to change the data item without changing its classification. In an illustrative embodiment, the class of small changes is restricted to not change the classification of a data item from data that is to be classified by the discriminator as real to data that is desired to be classified as artificial or fake. Computer system 300 may limit the magnitude of a type of small change as specified by hyperparameters that the system designer and/or the training process control system 221 have tuned by prior experience in similar tasks. Preferably, in selecting a small change, computer system 300 may use a random process so that there is no limit to the quantity of distinct new data items that may be created and selected.

In some embodiments, computer system 300 may use simulated adversarial attacks to augment a data item. Although sharing the adversarial attribute, an adversarial attack process is different from an adversarial generator. An adversarial attack is an attack on a categorical classifier. The attack makes a small change in a selected data item. The objective of the adversarial attack is to make a change in the data item such that the correct category of the changed data item is still the same category as the original selected data item but such that the categorical classifier mistakes the new item as being a different category. Simulated adversarial attacks are well known to those skilled in the art of training defenses against adversarial attacks.

For computing the adversarial attack, computer system 300 may use a previously trained classifier system that has been trained on a training set that overlaps with the training set for the discriminator and generator systems. As an aspect of the invention, computer system 300 uses the simulated adversarial attack not for the purpose of causing the classifier system to mistake the new data item as a different category, but merely to find new directions for making small changes in selected data items beyond those directions selected by the class of small changes due to defined transformations such as translations, rotations, color changes, and so forth. Since the simulated adversarial attack is not aimed at producing a specified categorical change, computer system 300 may select as a target for the direction of the small adversarial attack a random weighting of all the categories of the classifier, optionally including the original classification. Thus, the direction of a simulated adversarial attack is determined by a random vector in an N dimensional space, where N is the number of categories in the pretrained classifier. As is well known to those skilled in the art of adversarial attack and defense, the magnitude of the change may be limited by a hyperparameter $\varepsilon$ imposed on an $L_p$ norm of the change vector, where commonly used values of p include 0, 1, 2, and infinity. Well known methods for computing an adversarial attack include the fast gradient sign method (FGSM), the projected gradient descent (PGD) method, and many others.

In some embodiments, computer system 300 may generate additional data in a supplemental cooperative generator system 229. Unlike in the training of adversarial data, computer system 300 uses real data in training the cooperative generator system 229. The generator in system 229 may be a modified version of any of (1) a generative adversarial network (GAN), (2) a generator 901 trained according to an embodiment of the present invention, or (3) some other form of generator that may be trained on other objectives in addition to being trained on an objective to fool a discriminator. However, in the training process for the modified version of the generator, computer system 300 may include real data, labeled as such. Note that such a modified generator is not valid for use as an adversarial generator. Instead, computer system 300 may use it as a cooperative generator. In some aspects of some embodiments, computer system 300 may limit the data to be selected to data that is accepted by a local region detector 973 specified by computer system 300 in block 227.

In some example embodiments, in the supplemental cooperative generator 229, computer system 300 may generate data by random variation around a real data item or around points on an interpolation in feature space among two or more real data items. The random variation in the cooperative data generator may use a trimmed probability distribution, such as a Gaussian distribution with data samples eliminated if the data sample is more than a specified number of standard deviations from the mean, where the limit is controlled by a hyperparameter specified, for example, by the training process control system 221. The limit may be for a fraction of a standard deviation <1.0. For a multivariate Gaussian, a limit may be imposed for each variable separately and/or for a vector norm on the vector of random variables. Preferably, the training process control system 221 is pretrained to set the trimming limit to assure the generation of data that is realistic to a criterion that is set by the system designer and/or the human team in the cooperative training process control system 221. In some embodiments, the human team may check selected examples of the data generated by the supplemental cooperative generator and may adjust the trimming limit.

In block 226, computer system 300 may do additional validation tests of the data generated by the cooperative generator 229. For example, computer system 300 may test a data item using a collection of one or more previously trained discriminator systems. The previously trained discriminator systems may have been trained on different data than the data currently being used to train the discriminator and adversarial generator systems. Preferably, the previously trained discriminator system has been trained using techniques such as those described herein to train the discriminator systems to generalize to new data not contained in the training data for previously trained discriminator systems. In some embodiments, human judgment may be used as a validation technique. Instances of human validation may be initiated either by the humans or by the AI systems in the cooperative training process control system. Preferably, the humans would control the relative frequency of human validation.

In some embodiments, computer system 300 may compute a consensus decision among a plurality of previously trained discriminator systems. For example, computer system 300 may accept a data item as realistic only if the data item is accepted by more than a specified majority of the previously trained discriminator systems.

After training as described herein, either the generator (or a local generator) or the discriminator (or a local discriminator or a local detector) could be deployed in an operational (e.g., non-training) setting, although the generator and/or discriminator could be further trained post-deployment. Thus, in some embodiments, computer system 300 retains the discriminator system not only for use in a reality validation system of block 226, but also for other applications. In some applications, the discriminator system is used, but the adversarial generator system is not. In some embodiments, computer system 300 may train the discriminator system on additional tasks, such as discussed in association with FIG. 7. In some embodiments, computer system 300 may cooperatively generate additional data in block 229 and/or additional data augmentation in block 228 as additional data for one or more additional objectives.

In some of these applications, computer system 300 may train a system to reject other data in addition to the data created by an adversarial generator. For example, computer system 300 may train a classifier system not only to detect and classify a set of target categories but also detect categories other than the target categories and to classify other data as not being in any of the categories. Computer system 300 may use such a classifier system as a discriminator, for example, by including the training data for the discriminator among the target categories and rejecting everything else. In another example embodiment, computer system 300 may discriminate the data in the target categories and the other categories, from all other data, including non-real data.

In an application for such a real vs non-real data discriminator, the desired discrimination may be between all real data and all non-real data, not just non-real data that is created by an adversarial generator that is trained to attempt to fool a discriminator.

In some embodiments, computer system 300 may obtain data from a categorical classifier that has been trained with additional classification options to represent data that in not in any of the specified categories. In such embodiments, in block 241, computer system 300 obtains data that such a classifier has classified as not in a specified set of categories.

In some embodiments, computer system 300 may obtain data from a categorical classifier that has been trained with additional categories that are not in a specified set of target categories. In such embodiments, in block 242, computer system 300 obtains data that such a categorical classifier has classified as being a category that is not in the specified set of categories.

In block 223, computer system 300 selects data obtained in blocks 225, 226, 228, 241 and/or 242 and supplies that data to the discriminator system 902 and/or to individual local region detectors 973 and local discriminators 971 as requested by computer system 300 in block 113, 114, 124, 133, and 143 of FIG. 1.

Computer system 300, in implementing aspects of the cooperative human plus AI training process control system 221, may control the quantity of data obtained by computer system 300 from each source in blocks 114 and 124.

In some embodiments, computer system 300 may implement a process of gradual refinement in which, in the final phase, one or more local regions may be small regions for which there are few, if any, data examples in the original set of training data. In such a case, computer system 300 may obtain from real data repository 225 additional data not included in the original set of training data. In some embodiments, computer system 300 may obtain additional data using cooperative generator 229.

In some embodiments, computer system 300 may continually obtain additional data in order to train the discriminator and adversarial generator system to better generalize to new data. In some embodiments, computer system 300 may drop some data from future rounds of the training process. Computer system 300 may add such dropped data to the repository 243. In some embodiments, computer system 300 may implement a systematic process of continually changing the data as controlled by the training process control system 221.

In some embodiments, computer system 300 may implement the mixed strategy for the discriminator player by requesting an amount of real data for a local detector 973 proportional to the relative probability of the local detector 973 in the player's mixed strategy.

Figure 3:
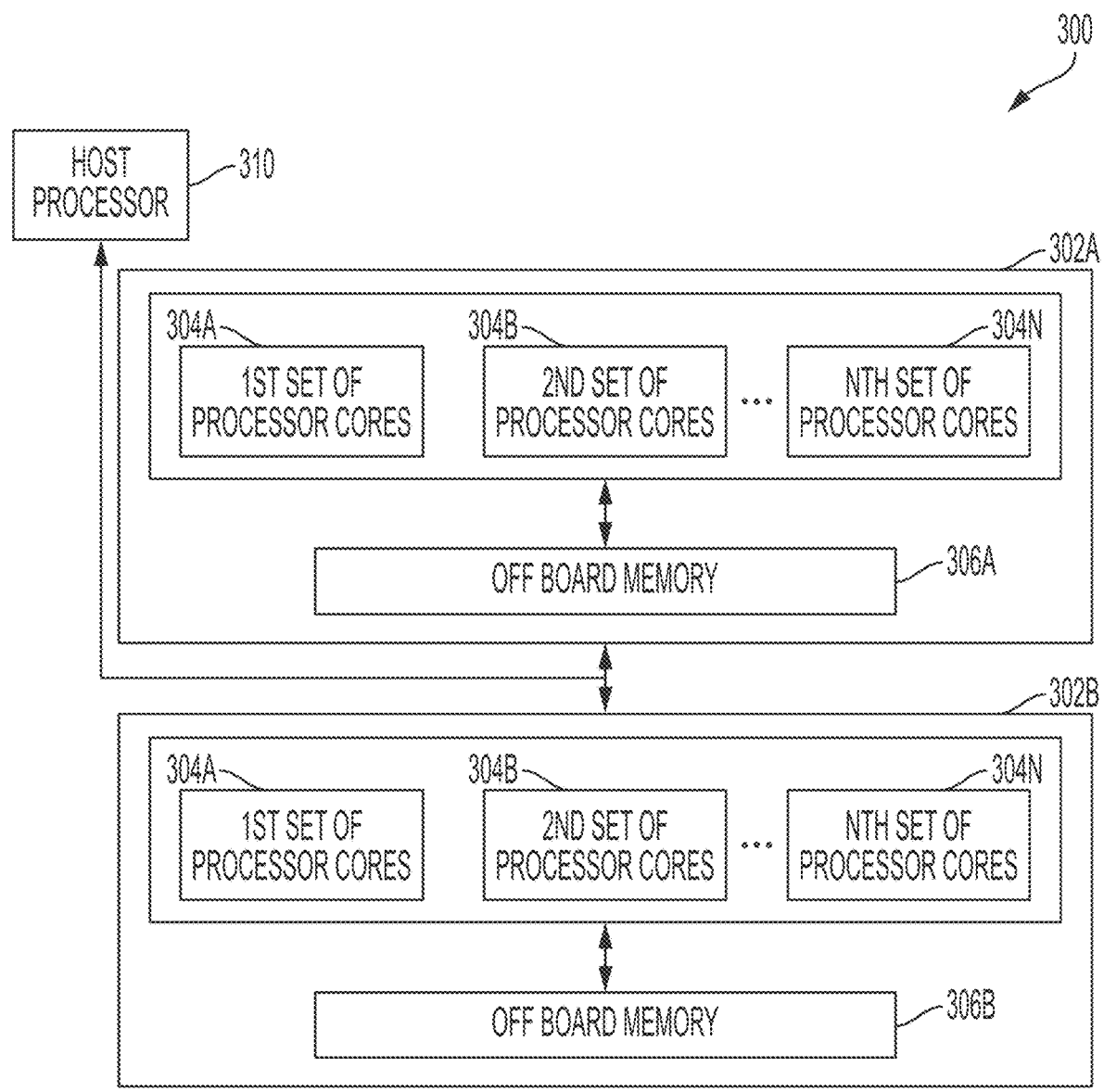
FIG. 3 is a diagram of a computer system that could be used to implement various embodiments of the invention.

FIG. 3 is a diagram of the computer system 300 that could be used to implement the embodiments described above, such as the processes described above in connections with various figures. The illustrated computer system 300 comprises multiple processor units 302A-B that each comprises, in the illustrated embodiment, multiple (N) sets of processor cores 304A-N. Each processor unit 302A-B may comprise on-board memory (ROM or RAM) (not shown) and off-board memory 306A. The on-board memory may comprise primary, volatile and/or non-volatile, storage (e.g., storage directly accessible by the processor cores 304A-N). The off-board memory 306A-B may comprise secondary, non-volatile storage (e.g., storage that is not directly accessible by the processor cores 304A-N), such as ROM, HDDs, SSD, flash, etc. The processor cores 304A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 310 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 304 may implement different steps of various processes and procedures. For example, in one embodiment, the cores of the first processor unit 302A may implement the training process for local discriminators 971 and the second processor unit 302B may implement the training process for adversarial generators 977. Further, different sets of cores in the first and/or second processor unit 302A, 302B may be responsible for stand-alone training of different local discriminators 971 or different local adversarial generators 977. As another example, another multiple processor unit 302C may implement the AI systems in the training process control system 221. Further, different sets of cores in processor unit 302C may be responsible for different AI systems. As a further example, another multiple processor unit 302D may implement the supplemental cooperative generator 229. Further, different cores in another multiple processor unit 302E may implement data augmentation 228 and data selection 223, respectively.

One or more host processors 310 may coordinate and control the processor units 302A-B. The process depicted in various figures can be embodied as a set of instructions stored within a memory (e.g., an integral memory of the processing units 302A, 302B or an off board memory 306A couple to the processing units 302A, 302B or other processing units) coupled to one or more processors (e.g., at least one of the sets of processor cores 304A-N of the processing units 302A, 302B or another processor(s) communicatively coupled to the processing units 302A, 302B), such that, when executed by the one or more processors, the instructions cause the processors to perform the aforementioned process by, for example, controlling the machine learning systems 221 and 222 or 701, 702, and 703 stored in the processing units 302A, 302B and 302C.

In other embodiments, the computer system 300 could be implemented with one processor unit. In embodiments where there are multiple processor units, the processor units could be co-located or distributed. For example, the processor units may be interconnected by data networks, such as a LAN, WAN, the Internet, etc., using suitable wired and/or wireless data communication links. Data may be shared between the various processing units using suitable data links, such as data buses (preferably high-speed data buses) or network links (e.g., Ethernet).

The software for the various computer systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, CUDA, Fortran, Java, Lisp, Pascal, Object Pascal, Haskell, ML; and examples of scripting languages include Bourne script, JavaScript, Python, Ruby, Lua, PHP, and Perl.

Figure 4:
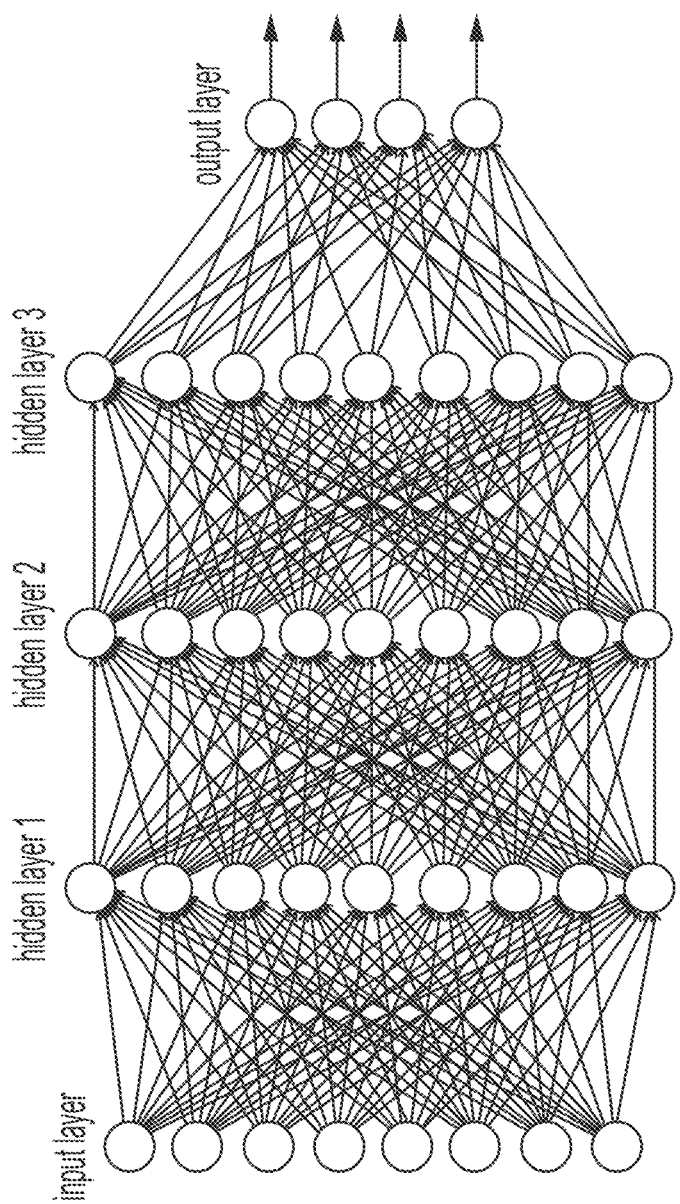
FIG. 4 is diagram of an illustrative example of a feed forward neural network.

FIG. 4 is diagram of an illustrative example of a feed forward neural network. The local generators 977 of the generator 901, as well as the local region detectors 973 and local discriminators 971 of the discriminator 902, and/or the cooperative data generator 229, for example, may be implemented with feed forward neural networks. The example network in FIG. 4 has an input layer, an output layer and three hidden or inner layers. The example network is a fully connected layered network with each non-input node receiving a connection from in node in the previously layer. More generally, in a feed forward network, any non-input node may receive connections from only a proper subset of the nodes in the previous layer and may also receive a connection from any node in any lower layer. In fact, any directed acyclic graph may define the connections in a feed forward neural network.

More generally, a neural network may have a connection from a node in a higher layer to itself or to a node in a lower layer, creating a recurrent neural network. However, without loss of generality, any recurrent neural network with a finite limit T on the number of steps of connections from a node to itself or to a lower node may be unrolled to a large feed forward neural network with T copies of the base network. The process of unrolling a recurrent neural network is well known to those skilled in the art of training neural networks.

FIG. 5 is a flow chart of an illustrative embodiment of an aspect of the invention in which computer system 300 may implement one or more forms of statistical smoothing. "Statistical smoothing" is a generic term referring to any of many techniques that are used in a variety of machine learning and statistical estimation systems. Generally, statistical smoothing is used to regularize the estimation of the learned parameters so that a statistical or machine learning model will generalize better to new data that was not including in the training of the system.

In training a discriminator and a generator in an adversarial relationship, there is an additional need for smoothing. This additional need occurs not only for embodiments of this invention but for training in any system in which a discriminator and generator are in an adversarial relationship in which the generator is trying to fool the discriminator.

In the zero-sum, two-person game formulation in this invention, for example, if unconstrained and trained on a finite quantity of training data, the von Neumann optimum solution for the discriminator is to memorize the training data and then accept all and only data items that exactly match a training data item.

However, this game theoretic optimum solution is not the desired outcome of the development process for these adversarial discriminator-generator systems. However, the desired outcome is to have the generator generate data items that are so similar to the training data items that the discriminator will be fooled. Computer system 300 may use statistical smoothing and other regularization methods so that the discriminator and the adversarial generators may train toward the objective of perfect performance without quite reaching it.

The flow chart of FIG. 5 is an illustrative embodiment of one way of organizing some of the statistical smoothing or regularization methods that may be used during training such as illustrated in FIG. 1. Because of the separation of the training of mixed strategies from the training of model parameters, the separation of updates of discriminator model parameters from the updates of the adversarial generator parameters, the optional use of a cooperative generator, the ability to mix neural networks with other kinds machine learning systems, and the cooperation of the human team and AI systems in the training process control system 221, computer system 300 may choose from a wide variety of methods of statistical smoothing and regularization. The examples illustrated in FIG. 5 are merely a sampling of the many methods that computer system 300 may use.

In block 501, computer system 300 sets the values of hyperparameters that control the degree of smoothing or regularization, as specified by the system design of the training process control system 221. The degree of smoothing may affect the esthetics of the generated examples as well as the performance of the discriminator, the cooperative generator, and/or the adversarial generators on new data. The AI systems in the training process control system 221 can make measurements of performance on set aside data. Preferably, human participation will be involved in judging the esthetics (511).

In block 502, computer system 300 selects one or more of the available methods of statistical smoothing and/or regularization. Computer system 300 may choose any of the methods illustrated in blocks 503-510 or any well-known method that may apply to the types of machine learning systems used in the embodiment of the invention.

For purposes of statistical smoothing, it may be sufficient to use only one or only a few of the many methods of smoothing and regularization that may be available. For example, if anti-plagiarism regularization (506) is used by computer system 300 in training the adversarial generators, there would generally be no need to use anti-plagiarism in the training of the cooperative generators, because in typical embodiments, computer system 300 allows the cooperative generators to copy training data examples. Computer system 300 may apply these methods of statistical smoothing and/or regularization in various orders and during various phases of the training process.

In block 503, in a discriminator or generator that is implemented as a neural network, computer system 300 may limit or regularize the weights on the connections in the neural network. For example, computer system 300 may impose a maximum value for the magnitude (absolute value) of any of the weights. In this and other limits used in blocks 503, 504, and 505, computer system 300 may either impose an absolute limit or a regularization penalty for a weight that exceeds a specified value. In some embodiments, computer system 300 may impose only a regularization penalty. The regularization penalty may, for example, be equal to a hyperparameter times the $L_1$ or $L_2$ norm of a connection weight.

In block 504, in a discriminator or generator that is implemented as a neural network, computer system 300 may limit the magnitude of the activations of some of the nodes in the neural network. For example, computer system 300 may use activation functions such as the sigmoid function or the hyperbolic tangent. During training, computer system 300 may impose a regularization penalty on a node with an unbounded activation function. Computer system 300 may specify a node-specific value on the magnitude beyond which the regularization penalty is applied. Computer system 300 may impose and adjust the node-specific value customized to situation at the point in the training at which the regularization is imposed, as controlled by the training process control system 221.

In block 505, in a discriminator or generator that uses parametric probability models, such as a Gaussian mixture model (GMM), computer system 300 may imposed a limit or regularization on the minimum value for a parameter that is a measure of spread, such as the standard deviation. Computer system 300 may impose this limit or regularization uniformly on all probability distributions in the mixture or may impose this limit or regularization selectively, with node-specific hyperparameters.

In block 506, computer system 300 may impose an anti-plagiarism regularization on an adversarial generator. As the name implies, in some applications an anti-plagiarism regularization may be needed separate from the need for smoothing. However, computer system 300 may impose an anti-plagiarism regularization as a method of statistical smoothing even in cases where there is no need to avoid plagiarism. In fact, an anti-plagiarism regularization is exactly targeted at preventing the adversarial generator from exactly coping the training data examples as that would otherwise be the von Neumann optimum solution.

Computer system 300 may base the anti-plagiarism penalty on the distance from a generated example and the closest data item in the training data. As a plagiarism prevention mechanism, computer system 300 may only need to search for the closest training data item that is in a specific list, such as artistic works under copyright or old masters. For statistical smoothing however, computer system 300 may check all training data items or a representative sample of the training data items if the training data is dense enough in the space. The method of measuring the distance may depend on the type of data. For images, for example, the distance may be an $L_p$ norm, $0 \leq p \leq \infty$, in the vector space of pixel values or in a feature space.

In block 507, computer system 300 may train local region detectors 973 that overlap. That is, two or more local region detectors 973 may all accept a data item. For statistical smoothing purposes, for a generated data item, computer system 300 may randomly select which local region detector 973 to associate with the item. In some embodiments, computer system 300 may independently randomly select the associated local region detector 973 when the same data item is presented later.

In block 508, computer system 300 may train a discriminator, a local detector, and/or a cooperative generator on multiple tasks, such as illustrated by the examples in FIG. 7. Training a machine learning system on multiple tasks has an indirect regularization effect. During training, computer system 300 automatically adjusts the learned parameters to the best compromise in meeting the total set of objectives, which will generally not be perfect in any one objective. In the training of a discriminator for the simulated game, memorizing the training data for the discriminator versus adversarial generator will generally not be possible because of the compromise in the solution to multiple tasks. It should be noted that the example tasks in FIG. 7 are tasks that naturally occur in various applications and are not designed specifically for the purpose of statistical smoothing and avoiding the von Neumann solution of memorizing the training data.

In block 509, computer system 300, in training the discriminators, may use target values that are less extreme than the limits of the range of output values. For example, if the range of values for the output variables in a discriminator is [0, 1], computer system 300 may use target values of, for example 0.1 and 0.9.

In block 510, computer system 300, may add additional data to the training set. Compared to many machine learning tasks, in various embodiments of this invention, there is no limit to the amount of training data that may be obtained. Computer system 300 may always use the cooperative generator 229 and/or the data augmenter 228 in the specialized data generator and selector 222 of FIG. 2 to obtain more data. Computer system 300 may also be able to obtain more data from the repositories 225 and 243. In preferred embodiments, computer system 300 obtains such additional data, as specified by the training process control system 221, to improve generalization performance on new data. The statistical smoothing effect of the additional data is an extra benefit.

In block 511, computer system 300 tests the performance of the discriminator system on data that has been held out from the training and/or that has been newly generated. In some embodiments, computer system 300 may obtain a judgement on the esthetic or other subjective qualities of the output of the cooperative generator or of the adversarial generator. Preferably, the subjective qualities are judged by humans, although the AI systems in the training process control system 221 may assist. Furthermore, the subjective judgements from humans needed by computer system 300 in block 511 do not require the humans to have expertise in machine learning. The humans supplying the subjective judgements may be domain experts or may be ordinarily end-users in the application for which the system is being trained. Thus, the process in block 511 is an instance of end-user human-guided AI.

If computer system 300 determines in block 511 that an adjustment in the smoothing control hyperparameters is desirable, then computer system 300 proceeds to block 512. Otherwise, computer system 300 is done with the process illustrated in FIG. 5.

FIG. 6 is a diagram of an embodiment of the invention as a three-person cooperative game. In the von Neumann-Morgenstern theory of n-person cooperative games, the analysis of the game involves coalitions among sets of players in contrast to the Nash equilibrium analysis of non-cooperative games.

In the illustrative example, the third player 603 comprises, a cooperative generator 607, a game strategy AI 604, a repository of data and models 605, and sets of feature mapping systems 606. These components are roughly equivalent to similar subsystems in the specialized data generator and selector 222 of FIG. 2. However, in the embodiment illustrated in FIG. 6, the situation is somewhat different because third system 603 may also form a coalition 612 with the adversarial generator player 601 rather than a coalition 613 with the discriminator decision module 602.

In one of the embodiments illustrated in FIG. 6, the game between any one player and the opposing two-player coalition is equivalent to a two-person game, which is preferably a zero-sum game.

In one example embodiment, the game between the adversarial generator player 601 and the coalition 613 of the discriminator player 602 and the data augmenter and selector player 603 is equivalent to the two-person game zero-sum game illustrated in the embodiment of FIGS. 1 and 2, except for the ability of player 603 to switch coalitions and changes in the assignment of game payoffs among the three players. In preferred embodiments, computer system 300 controls the switching of coalitions, as controlled by the training process control system 221. In preferred embodiments, a coalition 611 of the adversarial generator player 601 and the discriminator player 602 is not used.

In some embodiments, computer system 300 randomly switches between a coalition 613 of the discriminator player 602 with the data augmenter and selector player 603 and a coalition 612 of the adversarial generator player 601 with the data augmenter and selector player 603. The probability and/or the frequency of switching coalitions may be controlled by the training process control system 221.

The game between the discriminator player 602 and the coalition 612 of the adversarial generator player 601 with the data augmenter and selector player 603 enables computer system 300 to arrange payoffs that make a direct payoff to from the discriminator player 602 to player 603 that in the zero-sum version of the two-person game of FIG. 1, is made to the adversarial generator player.

During a play of the game, the discriminator player 602 receives a data item but like in the two-player game illustrated in FIG. 1, the discriminator player does not know whether computer system 300 obtained the data item from player 603, the equivalent of the specialized data generator and selector 222 of FIG. 2, or from player 601, the adversarial generator player.

In an example embodiment, if computer system 300 during a play of the game obtains a data item from the data augmentation and selector player 603, then discriminator player 602 makes a payment to or receives a payment from player 603. For example, the payoff to player 603 may be +1 or −1, depending on whether the discriminator correctly identifies the data item as obtained from player 603. That is, the payment to player 603 may be +1 (and conversely a payoff of −1 to the discriminator) if the discriminator 902 incorrectly identifies the data item; and the payoff may be −1 to the player 603 (and conversely +1 to the discriminator) if the discriminator correctly identifies the data item.

On the other hand, if computer system 300 during a play of the game obtains a data item from the adversarial generator player 601, then discriminator player 602 makes a payment to or receives a payment from adversarial generator player 602. The payoff to discriminator player 602 may be +1 or −1, depending on whether the discriminator correctly identifies the data item as obtained from adversarial generator player 601.

In one example embodiment, in a play of the game, computer system 300 randomly chooses whether a data item to be presented to discriminator player 602 is obtained from adversarial generator player 601 or from data augmentation and selector player 603, with the coalition of adversarial generator 601 and player 603 having no control over the choice of the source of the data. This embodiment results in a training process like the training process of the two-person zero-sum game illustrated in FIGS. 1 and 2, with similar results.

In another example embodiment, computer system 300 may give some control of the choice of the source of the data item to be presented to the discriminator player 602 to the coalition of adversarial generator player 601 and data augmentation and selector player 603, with the amount of control over the choice specified by the training process control system 221. This flexibility enables the training process control system 221 to fit application objectives that are external to the game. For example, based on the application, computer system 300 or the human team in the training process control system may specify that avoiding mode collapse is more important than proportionately modeling the probability distribution of the data of the data among local detector regions 973, or the other way around. Computer system 300 may adjust the ratio of data obtained from data augmentation and selector player 603 to the data obtained from adversarial generator player 601 to achieve the desired balance. In some embodiments, computer system 300 may change the ratio as specified by the training process control system 221, because the ratios may need to be different as the detector regions become smaller.

As mentioned in the discussion of block 508 of FIG. 5, in some embodiments of the invention the discriminator and the cooperative generator may be trained with a plurality of objectives. FIG. 7 is an illustrative embodiment of a system comprising a generator 701, a classifier or discriminator 703, and a discriminator 702 that are trained with multiple objectives, with a list of example tasks in which such a system may be used in the training process.

In FIG. 7, in some embodiments, discriminator 702 may be one of the local discriminators 971 in the illustrative embodiment of the invention shown in FIGS. 1 and 2. Cooperative generator 701 can be like the cooperative generator 229 in FIG. 2. The system illustrated in FIG. 7 also comprises one or more additional discriminators or classifiers 703, which are trained to perform tasks such as those listed in block 720. Though only one additional discriminator or classifier is shown in the diagram, any number of additional discriminators/classifiers 720 may be used, as indicated by the ellipsis " . . . ".

In the embodiment illustrated in FIG. 7 there are one or more connections from nodes in the discriminator 702 to the additional discriminator or classifier 703. A connection from the discriminator 702 may be made by computer system 300 from any inner node or input node of discriminator 702. A connection from an input node of discriminator 702 is equivalent to a connection from an output node of cooperative generator 701, which is what is illustrated.

Computer system 300 may make a connection from a node in discriminator 702 to any node of discriminator or classifier 703, including input nodes and output nodes.

One example task is to allow end-user human-preferences among a list of generated examples. The end-user human preferences could be, for example, colors, object, hues, shapes, etc. in images; sounds, melodies, instruments, etc. in audio; words, sentence structures, etc. in text, etc. The embodiment of allowing end-user human-preferences is distinct from and is in addition to the human judgement discussed in association with block 511 of FIG. 5. In this embodiment, computer system 300 presents a set of two or more images or other generated items to a human. The human may be an end user or a system developer. If a pair of items is presented, the human may specify a preference for one or the other or indicate no preference.

In some embodiments, if more than two items are presented at once, the human selects the most preferred. In some embodiments, the human may separate the presented items into two groups, a preferred group and a less preferred group.

In these embodiments, subsystem 703 discriminates between preferred items from non-preferred items. If the human participant indicates a preference, then computer system 300 back propagates the derivatives of that preference as a training target for discriminator 703. Computer system 300 also back propagates the derivatives of that target from nodes in discriminator 703 that receive connections from discriminator 702 back to the source node of each connection and then back to the subnetwork of the source node. Finally, computer system 300 back propagates the derivatives through the input nodes of discriminator 702 to the cooperative generator 701. By the addition rule of derivatives, computer system 300 adds these derivatives back propagated from discriminator 703 to the derivatives computer system 300 back propagates from the target outputs in the training of discriminator 703 in its primary task of discriminating data items obtained from the cooperative generator from data items obtained from an adversarial generator.

There is no direct back propagation to the adversarial generator except on items generated by the adversarial generator. However, the competitive process of embodiments such as illustrated in FIG. 1 will cause the adversarial generator to learn to imitate the data items generated by cooperative generator 701 to satisfy the human preferences back propagated through discriminator 703.

In some embodiments, cooperative generator 701 may generate data accepted by more than one local detector 973. If computer system 300 back propagates a human preference that favors one of the local detectors 973, the effect may be to increase the number of generated items in that local detector region, which may effectively shift the mixed strategy of the discriminator player.

In some applications, it is useful to discriminate data items that are in the manifold that represents real data from data that is off the manifold. That is, the discriminator should be trained to reject all non-real data, including data remote from the manifold not just to reject data generated by the adversarial generator, which once well trained will only generate data close to the manifold.

In examples 2, 3, and 4 in the list in box 720, discriminator 703 is trained to discriminate real data from a specified source from various other sources data, including non-real data.

In example 2, discriminator 703 discriminates real data from arbitrary non-real data. For example, computer system 300 could obtain the non-real data by randomly sampling in the data space of block 101 of FIG. 1 or in a feature space of block 102 of FIG. 1. In both cases, the real data will generally lie on or near a lower dimensional manifold, so most randomly selected data from the higher dimensional space will be non-real data. The back propagation and training process for this example is the same as discussed above for the human preference discriminator.

In example 3, system 703 is a classifier that is trained to classify data into a specified set of categories where the number of categories is greater than two. However, in the illustrative embodiment of example 3, the categories of classifier 703 are divided into a target set of categories that are to be distinguished from the other categories. This process may be useful, for example, there is a feature that is present in one of the sets of categories and not present in the other set of categories. Computer system 300 would then be training discriminator 14 to recognize the presence or absence of the feature.

In example 4, system 703 is a classifier trained to classify data into two or more categories. In a preferred embodiment, in example 4, classifier 703 also has an output that indicates that the data item does not match the model for any of the categories. Computer system 300 may use such a classifier when training a system on data for which only some of data has been labelled as to category. The unlabeled data may contain data items that do not belong to any of the categories. In such a case, computer system 300 may train classifier 703 with one or more extra output nodes representing data that learn to represent clusters in the data that is not in any of the regular categories. Computer system 300 may back propagate to discriminator 702 the characterization of a data item being one of the known categories versus not being one of the known categories. Computer system 300 would then be training discriminator 702 in both the task of discriminating data obtained from the data augmenter and selector 222 from data obtained from an adversarial generator and in the task of discriminating data in known category of classifier 703 than is not in a known category of classifier 703. As explained before, training discriminator 702 on multiple tasks causes statistical smoothing and regularization that also helps discriminator 702 generalize better to new data.

In example 5, computer system 300 trains discriminator 703 to distinguish between data generated by a first generator from data generated by a second generator. The back propagation and the effect of training the discriminator on dual tasks are similar to that in the previous examples. Note that, in the task of discriminating between two generators, computer system 300 has no limit on the amount of data that computer system 300 may obtain from each generator, so computer system 300 should be able to train discriminator 703 to be arbitrarily accurate if computer system 300 uses a neural network or other universal approximator for the design of discriminator 703. On the other hand, as in the other examples, the dual task in the training of discriminator 702 produces statistical smoothing and regularization that should improve generalization.

In example 6, computer system 300 trains discriminator 703 to detect adversarial attacks. An adversarial attack is a data item that has been modified in a way that does not change the correct categorical label but that causes the attacked classifier to misrecognize that category of the data item. In many adversarial attacks, the modified data item is nearly indistinguishable from the original to a human observer. Defending against adversarial attacks is an important problem in computer security. Defending against adversarial attacks involves detecting that an adversarial attack has occurred and then correcting the error. In this example, the back propagation and training of discriminator 702 on dual tasks has the same beneficial effects as discussed above.

In example 7, computer system 300 trains discriminator 703 to detect plagiarism, which is directly useful in the training process of the embodiment illustrated in FIGS. 1 and 2. In example 7, computer system 300 creates training data for discriminator 703 by selecting data examples from a set of training data training discriminator 703 to distinguish those examples from new data items where computer system 300 creates each new item by modifying a selected data example by an amount that is so small that the new item would be plagiarizing the original. Computer system 300 may then use discriminator 703 to detect data generated by the adversarial generator that should be subject to an anti-plagiarism penalty. Again, back propagation to discriminator 702 has the beneficial effects of training discriminator 702 on dual tasks.

In example 8, computer system 300 trains discriminator 703 to distinguish unperturbed data from data that has been perturbed by adding noise or making other perturbations to the original data item. In example 8, computer system 300 may then use discriminator 703 as a component in a system to remove noise from a signal, image or other data item. In example 8, computer system 300 would compute back propagation and dual training of discriminator 702 as described before. In example 9, computer system 300, as an additional objective, may train a discriminator or a detector as a subsystem of a network performing a general classification task for which there is training data in the data space of the discriminator or detector. In some embodiments, computer system 300 may save one or more discriminators and/or one or more detectors for later use in additional tasks such as examples 1 to 9. In some embodiments, computer system 300 may do additional training for such an additional task.

In some embodiments, computer system 300 may use, at some stages of the learning process, simple discriminator models that require few computational resources to train. Computer system 300 may later train more complex discriminator models.

For example, FIG. 8 illustrates an example embodiment of an aspect of the invention in which computer system 300 may use simple discriminators (block 809 of FIG. 8) to quickly divide the feature space into local regions. This process may be used by computer system 300 to quickly define the local regions (see block 103 of FIG. 1) when the feature space (102 of FIG. 1) or the data space (101 of FIG. 1) has been changed.

FIG. 8 illustrates an embodiment of an aspect of the invention which computer system 300 may use in a development process that comprises multiple stages in which the data space may be replaced by a new data space, such as in a succession of refinements in the resolution of an image. In this embodiment, in some stages, computer system 300 may train simple discriminators (809) and optionally skip training of more refined generators and discriminators.

FIG. 8 is a flow chart of an illustrative embodiment for a development process for creating successive refinements of the data space and of the local regions in each data space. If the process of FIG. 8 is starting from scratch, computer system 300 may use a uniform discriminator as the discriminator for each region and a uniform probability distribution to randomly generate data for each region. In block 801, computer system 300 trains a classifier for the current data space. In block 802, computer system 300 trains clusters within each category. In block 803, computer system 300 may train additional clusters on unlabeled data or use supervised or unsupervised training to train additional clusters on labeled data that has been set aside from the training in block 802. In block 804, computer system 300 trains or supplements the base training of a feature encoder by back propagation during the training in blocks 801, 802, and 803. In block 805, computer system 300 may select a region, such as a region created in block 103 of FIG. 1 in a previous pass through the loop from block 103 to block 173. Alternately, computer system 300 may initialize the set of regions with a single region that covers the current data space or feature space. In block 806, computer system 300 obtains an adversarial generator for a selected local region and, optionally a cooperative generator for the selected region. In block 807, computer system 300 obtains from specialized data generator and selector system 222 of FIG. 2 a specified amount of cooperative data in the selected region. In block 808, computer system 300 obtains from the adversarial generator system a specified amount of adversarial data.

In block 809, computer system 300 trains a simple discriminator for the region. Examples of simple discriminators may include, without loss of generality: (1) a uniform distribution or null discriminator, (2) a linear regression, (3) a discriminator with a linear hyperplane decision boundary (4) a one-node artificial neural network, (5) a support vector machine with a limit on the number of variables, (6) a neural network with a limit on the number of epochs of training not necessarily trained to convergence, or any other machine learning system that is easy to represent and/or train. The task of the simple discriminator is merely to do a preliminary separation of data obtained from specialized data generator and selector 222 from data generated by an adversarial generator. With optional further discriminator training by computer system 300 in block 816, computer system 300 will use this simple discriminator to divide the current local region into a plurality of smaller regions.

In block 810, computer system 300 determines whether to do further training to refine the generators and discriminators trained in block 809, based on criteria specified by the training process control system 221.

For example, in some embodiments, in early phases of the refinement of the data space, computer system 300 may determine not to refine the generators and discriminators for any region, since new discriminators and generators will be trained in later refinements of the data space.

As another example, computer system 300 may determine not to refine the discriminators and generators of a region that is smaller than a criterion set by the training process control system 221. For example, computer system 300 may determine not to refine any region that is contained in an anti-plagiarism region. More generally, in some embodiments, computer system 300 may select a uniform distribution in block 809 and determine not to refine the discriminators and generators for the region if the entire region in contained within a hypersphere of radius smaller than the specified anti-plagiarism distance.

In block 811, computer system 300 may divide the selected region into multiple regions based on the classification category of one or more local discriminators 971. In some embodiments, computer system 300 may build a decision tree with branch points corresponding to the discriminators used in successive splitting of each region. Computer system 300 may use the leaves of this decision tree as local region detectors 973. In some embodiments, computer system 300 may train a separate detector to detect the data in a leaf of the decision tree.

In block 812, computer system 300 determines whether to continue to divide regions. If so, computer system 300 returns to block 806. Otherwise, computer system 300 is done for this round. However, computer system 300 may repeat the process of FIG. 8 in later rounds of refinement of the data space or the feature space. In some embodiments, computer system 300 may do the process of FIG. 8 for every round of refinement of the data space or the feature space.

In block 813, computer system 300 trains the discriminators and generators, for example, using the techniques illustrated in blocks 132-134 and 142-144 of FIG. 1. In block 814, computer system 300 obtains adversarial data. In block 815, computer system 300 obtains cooperative data. In some embodiments, in block 816, computer system 300 may train a region divider discriminator based on the adversarial and cooperative data obtained by computer system 300 in blocks

814 and 815. In some embodiments, computer system 300 may use the discriminators trained by computer system 300 in block 813 as a region divider.

The generators and discriminators (e.g., the local generators 977 and/or local discriminators 971) described herein, trained as described herein, may be used to generate data and discriminate data, as the case may be. The data could be images, text, medical-related diagnostic data, etc.

Following the training as described herein, either the generator (or one or more of the local generators) or the discriminator (or one or more of the local discriminators and/or detectors) or the cooperative generator(s) can be deployed in an operational setting, although the generator, the discriminator and/or the cooperative generator may continue to be trained post-deployment. For example, the generator (or one or more of the local generators or the cooperative generator) could be deployed to generate data to train another machine learning system, such as a machine learning classifier. The generated data could be images (e.g., synthetic images) with examples (both positive and negative) of a medical condition that are used to train a medical imaging system through machine learning to detect the medical condition in the images. For example, the generator once trained may be deployed to generate MRI scan images, tomographic scan images, such as for CT (computed tomography), OCT (optical coherence tomography), or PET (positron emission tomography), X-ray images, and/or ultrasound scans, to train through machine learning a corresponding classifier for medical conditions that are detectable in the scans/images. The generator could also be used to generate images or videos of objects that can be used to train a computer vision system to detect the object in the images or videos. The computer vision system could be part of a robot or autonomous vehicle, for example. The generator could also be deployed, for example, to generate synthetic cyber-threats that could be used to train a cybersecurity system to The discriminator, any of the local discriminator, and/or any of the local detectors could be deployed following training as described herein. In various embodiments, after the cooperative training described herein, the discriminator(s) and/or detector(s) may also be trained with additional training data in the data space of the discriminator or detector before deployment. The discriminator(s) and/or detector(s) may also be trained to perform an additional task(s) as described above in connection with FIG. 7 before deployment.

In one general aspect, therefore, the present invention is directed to computer systems and methods for training a generator and discriminator adversarially. In one embodiment, the method comprises training, through machine learning, by a computer system, the generator and discriminator together in a multi-player, simulated game, where the simulated game comprises multiple rounds where, in each round, the discriminator determines whether a selected data item, presented to the discriminator, is from the generator or from a data source that is different from the generator. The training comprises: (i) training the discriminator to perform a first task, wherein the first task is whether the selected data item, presented to the discriminator, is from the generator or from the data source; (ii) training the generator to generate data that the discriminator incorrectly determines is not from the generator; and (iii) updating iterative updates to model parameters for the generator and to the discriminator, where the model parameters for the generator and for the discriminator are updated non-simultaneously.

In another embodiment, the method comprises training, through machine learning, by a computer system, the generator and discriminator together in a multi-player, simulated game, where the simulated game comprises multiple rounds where, in each round, the discriminator determines whether a selected data item, presented to the discriminator, is from the generator or from a data source that is different from the generator. The training comprises: (i) training the discriminator to perform a first task, wherein the first task is whether the selected data item, presented to the discriminator, is from the generator or from the data source; (ii) training the generator to generate data that the discriminator incorrectly determines is not from the generator; and iteratively updating model parameters for the generator and to the discriminator. The training can comprise two rounds. In a first round of the simulated game, the training comprises: (a) updating, by the computer system, a current mixed strategy for the discriminator to thereby produce an updated mixed strategy for the discriminator; (b) obtaining, from the data source, a first data item based on the updated mixed strategy for the discriminator; (c) generating, by the generator, a second data item using a current mixed strategy for the generator; (d) inputting, by a computer system, a first selected data item to the discriminator, where the first selected data item is either the first data item or the second data item, wherein the computer system makes a first selection of either the first data item or the second data item, and wherein the discriminator does not know the first selection by the computer system; (e) determining, by the discriminator, whether the first selected data item was generated by the generator; (f) determining, by the computer system, whether the discriminator correctly determined whether the first selected data item was generated by the discriminator; and (g) assigning, by the computer system, a first payoff for the generator and for the discriminator based on whether the discriminator correctly determined whether the first selected data item was generated by the discriminator. In the second round of the simulated game, the training can comprise: (h) updating, by the computer system, the current mixed strategy for the discriminator to thereby produce an updated mixed strategy for the generator; (i) obtaining, from the data source, a third data item based on the updated mixed strategy for the discriminator; (j) generating, by the generator, a fourth data item using the updated mixed strategy for the generator; (k) inputting, by a computer system, a second selected data item to the discriminator, where the second selected data item is either the third data item or the fourth data item, wherein the computer system makes a second selection of either the third data item or the fourth data item, and wherein the discriminator does not know the second selection by the computer system; (l) determining, by the discriminator, whether the second selected data item was generated by the generator; (m) determining, by the computer system, whether the discriminator correctly determined whether the second selected data item was generated by the discriminator; and (n) assigning, by the computer system, a second payoff for the generator and for the discriminator based on whether the discriminator correctly determined whether the second selected data item was generated by the discriminator.

In various implementations, the simulated game is a two-person, zero-sum game, such as a two-person, finite zero-sum game.

In various implementations: in the first round of the simulated game, updating the current mixed strategy for the discriminator comprises updating the current mixed strategy for the discriminator based on payoffs from rounds of the simulated game prior to the first round; and in the second round of the simulated game, updating the current mixed strategy for the generator comprises updating the current mixed strategy for the generator based on payoffs from rounds of the simulated game prior to the second round.

In various implementations, updating the current mixed strategy for the discriminator comprises finding a pure strategy for the discriminator that performs better against a then-current mixed strategy of the generator than does the current mixed strategy of the discriminator; and updating the current mixed strategy for the generator comprises finding a pure strategy for the generator that performs better against a then-current mixed strategy of the discriminator than does the current mixed strategy of the generator.

In various implementations, the training further comprises, after the second round: iteratively updating, by the computer system, model parameters for the discriminator; and iteratively updating, by the computer system, model parameters for the generator, such that model parameter for the generator are updated non-simultaneously with the updates to the model parameter for the discriminator.

In various implementations, the discriminator comprises a plurality of local region detectors. Also, each of the plurality of local region detectors is trained, through machine learning, to discriminate whether a presented data item to the local region detector is accepted or rejected as being a member of a specified set associated with the local region detector. Also, in the first round of the simulated game, updating the current mixed strategy for the discriminator comprises selecting one of the plurality of local region detectors, such that the first data item from the data source is based on the selected one of the plurality of local region detectors.

In various implementations, a specified set for a first local region detector overlaps in part with a specified set for a second local region detector.

In various implementations, the discriminator comprises a plurality of local discriminators.

In various implementations, the generator comprises a plurality of local generators. Also, each of the plurality of local generators is trained, through machine learning, to generate data items that are in a local data region associated with the local generator. Also, in the second round of the simulated game, updating the current mixed strategy for the discriminator comprises selecting one of the plurality of local generators, such that the fourth data item is generated by the selected local generator.

In various implementations, the discriminator comprises a plurality of local discriminators, where each of the plurality of local discriminators is trained to determine whether a data item presented to the local discriminator is from the generator.

In various implementations, each of the plurality of local generators comprises a neural network; each of the plurality of local region detectors comprises a neural network; and each of the plurality of local discriminators comprises a neural network.

In various implementations, the method further comprises, prior to the first round of the simulated game: training, with the computer system, through machine learning, the plurality of local generators; training, with the computer system, through machine learning, the plurality of local detectors; and training, with the computer system, through machine learning, the plurality of local discriminators.

In various implementations, the data source comprises a cooperative generator that is trained to be cooperative with the discriminator.

In various implementations, training of the cooperative generator is controlled by a cooperative human plus AI training process control system.

In various implementations, the discriminator comprises a neural network with a first node; the first node has a connection to a second node in an additional machine learning system; the additional machine learning system is trained to perform a task that is separate from tasks of the discriminator and the generator; and training the discriminator comprises training the discriminator with an additional objective from the additional machine learning system, such that training the discriminator with the additional objective comprises back propagating derivatives from the second node of the additional machine learning system to the first node of the discriminator.

In various implementations, the cooperative generator comprises a neural network with a third node; the third nodes has a connection to a fourth node in the additional machine learning system; and the method further comprises training the cooperative generator with the additional objective from the additional machine learning system, such that training the cooperative generator with the additional objective comprises back propagating derivatives from the fourth node of the additional machine learning system to the second node of the cooperative generator.

In various implementations, the generator comprises a generator selected from the group consisting of a digital image generator, a digital audio generator, and a text generator.

In various implementations, the method further comprises deploying the generator to generate data after the training.

In various implementations, the method further comprises additionally training the discriminator to perform a second task. The second task might comprise a determination of whether a data item input to the discriminator would appeal to a human with a known preference; a determination of whether a data item input to the discriminator is real or arbitrary; a determination of whether a data item input should be classified to a specified set of two or more classification categories; a determination of whether a data item input should be classified to one of a plurality of classification categories or not; a determination of whether a data item input to the discriminator is from a first generator or from a second generator; a determination of whether a data item input to the discriminator is an adversarial attack; a determination of whether a data item input to the discriminator is a plagiarized work; a determination of whether a data item input to the discriminator is perturbed or not; and/or a classification task.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method of training a generator and discriminator adversarially, the method comprising training, through machine learning, by a computer system, the generator and discriminator together in a multi-player, simulated game, wherein the simulated game comprises multiple rounds where, in each round, the discriminator determines whether a selected data item, presented to the discriminator, is from the generator or from a data source that is different from the generator, and wherein the training comprises:

training the discriminator to perform a first task, wherein the first task is whether the selected data item, presented to the discriminator, is from the generator or from the data source;

training the generator to generate data that the discriminator incorrectly determines is not from the generator; and iteratively updating model parameters for the generator and for the discriminator, wherein the training comprises:

in a first round of the simulated game:
updating, by the computer system, a current mixed strategy for the discriminator to thereby produce an updated mixed strategy for the discriminator;
obtaining, from the data source, a first data item based on the updated mixed strategy for the discriminator;
generating, by the generator, a second data item using a current mixed strategy for the generator;
inputting, by a computer system, a first selected data item to the discriminator, where the first selected data item is either the first data item or the second data item, wherein the computer system makes a first selection of either the first data item or the second data item, and wherein the discriminator does not know the first selection by the computer system;
determining, by the discriminator, whether the first selected data item was generated by the generator;
determining, by the computer system, whether the discriminator correctly determined whether the first selected data item was generated by the generator; and
assigning, by the computer system, a first payoff for the generator and for the discriminator based on whether the discriminator correctly determined whether the first selected data item was generated by the generator; and in a second round of the simulated game:
updating, by the computer system, the current mixed strategy for the discriminator to thereby produce an updated mixed strategy for the generator;
obtaining, from the data source, a third data item based on the updated mixed strategy for the discriminator;
generating, by the generator, a fourth data item using the updated mixed strategy for the generator;
inputting, by a computer system, a second selected data item to the discriminator, where the second selected data item is either the third data item or the fourth data item, wherein the computer system makes a second selection of either the third data item or the fourth data item, and wherein the discriminator does not know the second selection by the computer system;
determining, by the discriminator, whether the second selected data item was generated by the generator;
determining, by the computer system, whether the discriminator correctly determined whether the second selected data item was generated by the generator; and
assigning, by the computer system, a second payoff for the generator and for the discriminator based on whether the discriminator correctly determined whether the second selected data item was generated by the generator.

2. The method of claim 1, wherein the simulated game is a two-person, zero-sum game.

3. The method of claim 2, wherein the two-person, zero-sum game comprises a two-person, finite zero-sum game.

4. The method of claim 1, wherein the model parameters for the generator and for the discriminator are updated non-simultaneously.

5. The method of claim 1, wherein:
in the first round of the simulated game, updating the current mixed strategy for the discriminator comprises updating the current mixed strategy for the discriminator based on payoffs from rounds of the simulated game prior to the first round; and
in the second round of the simulated game, updating the current mixed strategy for the generator comprises updating the current mixed strategy for the generator based on payoffs from rounds of the simulated game prior to the second round.

6. The method of claim 5, wherein:
updating the current mixed strategy for the discriminator comprises finding a pure strategy for the discriminator that performs better against a then-current mixed strategy of the generator than does the current mixed strategy of the discriminator; and
updating the current mixed strategy for the generator comprises finding a pure strategy for the generator that performs better against a then-current mixed strategy of the discriminator than does the current mixed strategy of the generator.

7. The method of claim 1, wherein the training further comprises, after the second round:
iteratively updating, by the computer system, model parameters for the discriminator; and
iteratively updating, by the computer system, model parameters for the generator, such that model parameter for the generator are updated non-simultaneously with the updates to the model parameter for the discriminator.

8. The method of claim 1, wherein:
the discriminator comprises a plurality of local region detectors;
each of the plurality of local region detectors is trained, through machine learning, to discriminate whether a presented data item to the local region detector is accepted or rejected as being a member of a specified set associated with the local region detector; and
in the first round of the simulated game, updating the current mixed strategy for the discriminator comprises selecting one of the plurality of local region detectors, such that the first data item from the data source is based on the selected one of the plurality of local region detectors.

9. The method of claim 8, wherein a specified set for a first local region detector overlaps in part with a specified set for a second local region detector.

10. The method of claim 8, wherein the discriminator comprises a plurality of local discriminators.

11. The method of claim 10, wherein:
the generator comprises a plurality of local generators;
each of the plurality of local generators is trained, through machine learning, to generate data items that are in a local data region associated with the local generator; and
in the second round of the simulated game, updating the current mixed strategy for the discriminator comprises selecting one of the plurality of local generators, such that the fourth data item is generated by the selected local generator.

12. The method of claim 11, wherein each of the plurality of local discriminators is trained to determine whether a data item presented to the local discriminator is from the generator.

13. The method of claim of claim 12, wherein:
each of the plurality of local generators comprises a neural network;
each of the plurality of local region detectors comprises a neural network; and
each of the plurality of local discriminators comprises a neural network.

14. The method of claim 13, further comprising, prior to the first round of the simulated game:
training, with the computer system, through machine learning, the plurality of local generators;
training, with the computer system, through machine learning, the plurality of local region detectors; and
training, with the computer system, through machine learning, the plurality of local discriminators.

15. The method of claim 1, wherein the data source comprises a cooperative generator that is trained to be cooperative with the discriminator.

16. The method of claim 15, wherein a training of the cooperative generator is controlled by a cooperative human plus AI training process control system.

17. The method of claim 15, wherein:
the discriminator comprises a neural network with a first node;
the first node has a connection to a second node in an additional machine learning system;
the additional machine learning system is trained to perform a task that is separate from tasks of the discriminator and the generator; and
training the discriminator comprises training the discriminator with an additional objective from the additional machine learning system, wherein training the discriminator with the additional objective comprises back propagating derivatives from the second node of the additional machine learning system to the first node of the discriminator.

18. The method of claim 17, wherein:
the cooperative generator comprises a neural network with a third node;
the third nodes has a connection to a fourth node in the additional machine learning system; and
the method further comprises training the cooperative generator with the additional objective from the additional machine learning system, wherein training the cooperative generator with the additional objective comprises back propagating derivatives from the fourth node of the additional machine learning system to the second node of the cooperative generator.

19. A computer system for training a generator and discriminator adversarially, the computer system comprising:
one or more processor cores; and
a memory in communication with the one or more processor cores, wherein the memory stores computer instructions that when executed by the one or more processor cores cause the one or more processor cores to train, through machine learning the generator and discriminator together in a multi-player, simulated game, wherein the simulated game comprises multiple rounds where, in each round, the discriminator determines whether a selected data item, presented to the discriminator, is from the generator or from a data source that is different from the generator, and wherein the memory stores instructions that cause the one or more processor cores to train the generator and discriminator together by:
training the discriminator to perform a first task, wherein the first task is whether the selected data item, presented to the discriminator, is from the generator or from the data source;
training the generator to generate data that the discriminator incorrectly determines is not from the generator; and
iteratively updating model parameters for the generator and for the discriminator, wherein the training comprises:
in a first round of the simulated game:
updating a current mixed strategy for the discriminator to thereby produce an updated mixed strategy for the discriminator;
obtaining, from the data source, a first data item based on the updated mixed strategy for the discriminator;
generating, by the generator, a second data item using a current mixed strategy for the generator;
inputting a first selected data item to the discriminator, where the first selected data item is either the first data item or the second data item, wherein the computer system makes a first selection of either the first data item or the second data item, and wherein the discriminator does not know the first selected data item;
determining, by the discriminator, whether the first selected data item was generated by the generator;
determining whether the discriminator correctly determined whether the first selected data item was generated by the generator; and
assigning a first payoff for the generator and for the discriminator based on whether the discriminator correctly determined whether the first selected data item was generated by the generator; and
in a second round of the simulated game:
updating the current mixed strategy for the discriminator to thereby produce an updated mixed strategy for the generator;
obtaining, from the data source, a third data item based on the updated mixed strategy for the discriminator;
generating, by the generator, a fourth data item using the updated mixed strategy for the generator;
inputting a second selected data item to the discriminator, where the second selected data item is either the third data item or the fourth data item, wherein the computer system makes a second selection of either the third data item or the fourth data item, and wherein the discriminator does not know the second selected data item;

determining, by the discriminator, whether the second selected data item was generated by the generator;

determining whether the discriminator correctly determined whether the second selected data item was generated by the generator; and assigning a second payoff for the generator and for the discriminator based on whether the discriminator correctly determined whether the second selected data item was generated by the generator.

20. The computer system of claim 19, wherein the simulated game is a two-person, zero-sum game.

21. The computer system of claim 20, wherein the two-person, zero-sum game comprises a two-person, finite zero-sum game.

22. The computer system of claim 19, wherein the model parameters for the generator and for the discriminator are updated non-simultaneously.

23. The computer system of claim 19, wherein the memory stores instructions that cause the one or more processor cores to:

in the first round of the simulated game, update the current mixed strategy for the discriminator by updating the current mixed strategy for the discriminator based on payoffs from rounds of the simulated game prior to the first round; and in the second round of the simulated game, update the current mixed strategy for the generator by updating the current mixed strategy for the generator based on payoffs from rounds of the simulated game prior to the second round.

24. The computer system of claim 23, wherein the memory stores instructions that cause the one or more processor cores to:

update the current mixed strategy for the discriminator by finding a pure strategy for the discriminator that performs better against a then-current mixed strategy of the generator than does the current mixed strategy of the discriminator; and update the current mixed strategy for the generator by finding a pure strategy for the generator that performs better against a then-current mixed strategy of the discriminator than does the current mixed strategy of the generator.

25. The computer system of claim 19, wherein the memory stores instructions that cause the one or more processor cores to, after the second round:

iteratively update model parameters for the discriminator; and iteratively update model parameters for the generator, such that model parameter for the generator are updated non-simultaneously with the updates to the model parameter for the discriminator.

26. The computer system of claim 19, wherein:

the discriminator comprises a plurality of local region detectors;

each of the plurality of local region detectors is trained, through machine learning, to discriminate whether a presented data item to the local region detector is accepted or rejected as being a member of a specified set associated with the local region detector; and the memory stores instructions that cause the one or more processor cores to, in the first round of the simulated game, update the current mixed strategy for the discriminator by selecting one of the plurality of local region detectors, such that the first data item from the data source is based on the selected one of the plurality of local region detectors.

27. The computer system of claim 26, wherein a specified set for a first local region detector overlaps in part with a specified set for a second local region detector.

28. The computer system of claim 26, wherein the discriminator comprises a plurality of local discriminators.

29. The computer system of claim 28, wherein:

the generator comprises a plurality of local generators;

each of the plurality of local generators is trained, through machine learning, to generate data items that are in a local data region associated with the local generator; and the memory stores instructions that cause the one or more processor cores to, in the second round of the simulated game, update the current mixed strategy for the discriminator by selecting one of the plurality of local generators, such that the fourth data item is generated by the selected local generator.

30. The computer system of claim 29, wherein the discriminator comprises a plurality of local discriminators, wherein each of the plurality of local discriminators is trained to determine whether a data item presented to the local discriminator is from the generator.

31. The computer system of claim of claim 30, wherein:

each of the plurality of local generators comprises a neural network;

each of the plurality of local region detectors comprises a neural network; and each of the plurality of local discriminators comprises a neural network.

32. The computer system of claim 31, further comprising, the memory stores instructions that cause the one or more processor cores to, prior to the first round of the simulated game:

train, through machine learning, the plurality of local generators;

train, through machine learning, the plurality of local detectors; and train, through machine learning, the plurality of local discriminators.

33. The computer system of claim 19, wherein the data source comprises a cooperative generator that is trained to be cooperative with the discriminator.

34. The computer system of claim 33, further comprising a cooperative human plus AI training process control system that is configured to control training of the cooperative generator.

35. The computer system of claim 33, wherein:

the discriminator comprises a neural network with a first node;

the first node has a connection to a second node in an additional machine learning system;

the additional machine learning system is trained to perform a task that is separate from tasks of the discriminator and the generator; and the memory stores instructions that cause the one or more processor cores to train the discriminator by training the discriminator with an additional objective from the additional machine learning system, such that training the discriminator with the additional objective comprises back propagating derivatives from the second node of the additional machine learning system to the first node of the discriminator.

36. The computer system of claim 35, wherein:
the cooperative generator comprises a neural network with a third node;
the third nodes has a connection to a fourth node in the additional machine learning system; and
the memory stores instructions that cause the one or more processor cores to train the cooperative generator with the additional objective from the additional machine learning system, such that training the cooperative generator with the additional objective comprises back propagating derivatives from the fourth node of the additional machine learning system to the second node of the cooperative generator.

* * * * *